(12) United States Patent
Mai et al.

(10) Patent No.: US 11,208,101 B2
(45) Date of Patent: Dec. 28, 2021

(54) DEVICE AND METHOD FOR MEASURING TRANSVERSE DISTRIBUTION OF WHEEL PATH

(71) Applicant: Shenzhen University, Shenzhen (CN)

(72) Inventors: Derong Mai, Shenzhen (CN); Xiangchen Fan, Shenzhen (CN); Fangjian Yang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 175 days.

(21) Appl. No.: 16/600,426

(22) Filed: Oct. 11, 2019

(65) Prior Publication Data

US 2020/0039513 A1 Feb. 6, 2020

Related U.S. Application Data

(63) Continuation-in-part of application No. PCT/CN2018/072785, filed on Jan. 16, 2018.

(30) Foreign Application Priority Data

Oct. 26, 2017 (CN) .......................... 201711011301.4

(51) Int. Cl.
*B60W 30/12* (2020.01)
*B60W 40/06* (2012.01)
*B60W 50/00* (2006.01)

(52) U.S. Cl.
CPC ............ *B60W 30/12* (2013.01); *B60W 40/06* (2013.01); *B60W 2050/0075* (2013.01); *B60W 2420/42* (2013.01); *B60W 2556/10* (2020.02); *B60W 2754/10* (2020.02)

(58) Field of Classification Search
CPC .......................... B60W 40/06; B60W 2420/62
See application file for complete search history.

(56) References Cited

U.S. PATENT DOCUMENTS

| | | | | |
|---|---|---|---|---|
| 2017/0345180 A1* | 11/2017 | Sugiura | ................. | G01S 7/4808 |
| 2018/0260651 A1* | 9/2018 | Wang | .................... | G06K 9/3241 |
| 2019/0294159 A1* | 9/2019 | Pedersen | .............. | G05D 1/0088 |
| 2020/0377083 A1* | 12/2020 | Kokaki | ............. | B60W 60/0015 |

* cited by examiner

*Primary Examiner* — Imran K Mustafa
(74) *Attorney, Agent, or Firm* — Matthias Scholl P.C.; Matthias Scholl

(57) ABSTRACT

A device of measurement of transverse distribution of a wheel path. The device includes a measurement device, a first database, an analysis device, and a second database. The measurement device is configured to measure a shape and size of one side of a horizontal section of each of a plurality of vehicles, and to measure a distance between the one side of the horizontal section of each of the plurality of vehicles and a road shoulder. The first database is configured to store data of the shape and size of one side of the horizontal section of each of the plurality of vehicles, and of the distance between the one side of the horizontal section of each of the plurality of vehicles and the road shoulder, and raw data of a shape and size of one side of a horizontal section of a plurality of wheels.

6 Claims, 28 Drawing Sheets

DEVICE AND METHOD FOR MEASURING TRANSVERSE DISTRIBUTION OF WHEEL PATH

CROSS-REFERENCE TO RELATED APPLICATIONS

This application is a continuation-in-part of International Patent Application No. PCT/CN2018/072785 with an international filing date of Jan. 16, 2018, designating the United States, now pending, and further claims foreign priority benefits to Chinese Patent Application No. 201711011301.4 filed Oct. 26, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of subgrade and pavement, and more particularly to a device and method for measuring transverse distribution of a wheel path.

When a vehicle is driving in a lane, the wheel path sways to the left and right within a certain range near the center line of the cross section of the lane. The wheel path is distributed on the cross section of the lane at a certain frequency. This is referred to as a transverse distribution of the wheel path.

The transverse distribution of the wheel path varies in different regions. Analyzing the transverse distribution characteristics is important for the design of pavement structures.

Conventionally, the wheel path transverse distribution is measured by on-site photography and videography. The method requires a plurality of surveyors to draw marks on the road and take photos and video of the wheel paths of vehicles. The conventional process is laborious and puts the surveyors at risk of accidents.

SUMMARY

The disclosure provides a device and method for measuring transverse distribution of a wheel path. The device and method can automatically detect the vehicle classification, wheel type, vehicle speed, and transverse distribution of the wheel path in all weather conditions.

The disclosure provides a device of measurement of transverse distribution of a wheel path, the device comprising a measurement device, a first database, an analysis device, and a second database.

The measurement device is configured to measure a shape and size of one side of a horizontal section of each of a plurality of vehicles, and to measure a distance between the one side of the horizontal section of each of the plurality of vehicles and a road shoulder where the plurality of vehicles is moving; the horizontal section of each of the plurality of vehicles is parallel to the road shoulder, and the one side of the horizontal section of each of the plurality of vehicles is parallel to the road shoulder.

The first database is configured to store data, measured by the measurement device, of the shape and size of one side of the horizontal section of each of the plurality of vehicles, and of the distance between the one side of the horizontal section of each of the plurality of vehicles and the road shoulder, and raw data of a shape and size of one side of a horizontal section of a plurality of wheels.

The analysis device is configured to analyze the data of the shape and size of one side of the horizontal section of each of the plurality of vehicles and the data of the distance between the one side of the horizontal section of each of the plurality of vehicles and the road shoulder, to obtain transverse distribution of a wheel path of each of the plurality of vehicles.

The second database is configured to store data of the transverse distribution of the wheel path of each of the plurality of vehicles, establish a frequency model of the transverse distribution of the wheel path of each of the plurality of vehicles, determine and output a coefficient of the transverse distribution of the wheel path of the plurality of vehicles.

The measurement device comprises an embedded development board and two ultra-high frequency (UHF) laser distance sensors; the two laser distance sensors are disposed side by side and parallel to the one side of the horizontal section of each of the plurality of vehicles on the same height to measure and store data to the first database.

The measurement device is configured to preliminarily screen, process and output the data of the shape and size of one side of the horizontal section of each of the plurality of vehicles and the data of the distance between the one side of the horizontal section of each of the plurality of vehicles and the road shoulder; to preliminarily screen the data refers to select an effective sample data in a certain target; to preliminarily process the data refers to calculate a vehicle speed V, fit original data collected by the two UHF laser distance sensors, convert the data from a distance-time (D-T) correlation to a distance-length (D-L) correlation, to yield real shape and size data of the one side of the horizontal section of each of the plurality of vehicles, and output the data to the first database.

The first database comprises a first area, a second area and a third area; the first area is a target vehicle database comprising the effective sample data of the shape and size of the one side of the horizontal section of each of the plurality of vehicles and the distance between the one side of the horizontal section of each of the plurality of vehicles and the road shoulder; the second area is a raw database comprising the shape and size of one side of a horizontal section of a plurality of wheels; the third database is a target wheel database comprising data of the shape and size of one side of the horizontal section of wheels of the plurality of vehicles selected from the first area; the data from the second database is updated by the data from the third database; and the data of the first area and the second area are available to the analysis device.

A method for measuring the transverse distribution of the wheel path comprises:

1) measuring, by a measurement device, a shape and size of one side of a horizontal section of each of a plurality of vehicles, and a distance between the one side of the horizontal section of each of the plurality of vehicles and a road shoulder where the plurality of vehicles is moving, wherein the measurement device comprises two ultra-high frequency (UHF) laser distance sensors disposed side by side and parallel to the one side of the horizontal section of each of the plurality of vehicles on the same height; the horizontal section of the vehicle is parallel to the road shoulder and has the same height as the two laser distance sensors;

2) acquiring, by the measurement device, analog signal voltage data of each of the plurality of vehicles, and identifying each of the plurality of vehicles according to the analog signal voltage data;

3) calculating a running speed of each of the plurality of vehicles; calculating a time interval of acquiring a vehicle signal by the two laser distance sensors; converting the analog signal voltage data into length data, to yield real shape and size data of the one side of the horizontal section of each of the plurality of vehicles; calculating an axle number and length of each of the plurality of vehicles, identifying a vehicle classification; storing the data of the vehicle classification and the data of the shape and size of one side of the horizontal section of each of the plurality of vehicles in a first database, to yield a target vehicle database;

4) creating a raw database of wheels in the first database, the raw database of wheels comprising a real shape and size of one side of a horizontal section of the wheels having characteristics of "concave-concave-concave-concave-concave" on the one side;

5) extracting the target vehicle database and the raw database of wheels from the first database, comparing, by the analysis device, similarity of the target vehicle database and the raw database of wheels, acquiring target wheels from the target vehicle database, storing the target wheels in a target wheel database, the target wheel database comprising the real shape and size of the one side of the horizontal section of the wheels and a distance between the one side of the horizontal section of the wheels and the two laser distance sensors; and 6) drawing, based on the target wheel database, a characteristic curve of transverse distribution of wheel path of each of the plurality of vehicles, calculating a coefficient of transverse distribution of the wheel path of each of the plurality of vehicles, acquiring sizes of a tire, rim, spoke and hub of wheels of each of the plurality of vehicles, and storing relevant data in a second database.

In 2), identifying each of the plurality of vehicles comprises: the analog signal voltage data comprising a plurality of consecutive signal points and blank areas between the plurality of consecutive signal points, when a number of the blank areas is larger than a certain value, dividing the analog signal voltage data into a plurality of segments; classifying the plurality of segments into different groups according to a range of the blank areas; and calculating a distance between data points and the laser distance sensors, and determining whether or not each group of data belongs to one vehicle.

The Pearson correlation coefficient of two groups of data of one vehicle respectively obtained by the two laser distance sensors is calculated; when the Pearson correlation coefficient is larger than 0.85, the running speed of the vehicle is calculated as follows: simultaneously scanning one side of the horizontal section of one wheel by the two laser distance sensors, calculating the running speed V by a horizontal distance S between the two laser distance sensors and a time interval Δt between two first data received by the two laser distance sensors; converting the data from a distance-time (D-T) correlation into a distance-length (D-L) correlation, to yield real shape and size characteristic data of one side of the horizontal section of the vehicle; and outputting the real shape and size characteristic data to the first database.

The target vehicle database is two-dimensional with length as an abscissa and distance as an ordinate; the time interval of acquiring a signal of a vehicle by the two laser distance sensors multiplies the running speed of the vehicle, to yield the real shape and size data of one side of the horizontal section of the vehicle; the real shape and size data is fitted and associated with the distance between one side of the horizontal section of the vehicle and the two laser distance sensors to yield the target vehicle data.

The raw database of wheels is two-dimensional with length as an abscissa and distance as an ordinate; the raw database of wheels is obtained in a laboratory following the method of establishing the target vehicle database where it is the wheels rather than the vehicles that are measured.

In 5), the target wheels are acquired as follows: calculating a Pearson correlation coefficient between a piece of data from the target vehicle database and a piece of data from the raw database of wheels; when the Pearson correlation coefficient is larger than 0.95, the piece of data from the target vehicle database is intercepted and stored in the target wheel database; the target wheel database is two-dimensional with length as an abscissa and distance as an ordinate.

Advantages of the device and method for measuring transverse distribution of a wheel path according to embodiments of the disclosure are summarized as follows:

(1) The device and method can acquire the data of the vehicle speed, vehicle density, lane width and vehicle classification, and analyze the influence of the factors on the transverse distribution coefficient of the wheel paths in different time periods.

(2) The measurement method has high accuracy, and can operate automatically in all weather conditions.

(3) The measurement device comprises two high-precision and ultra-high frequency laser distance sensors, and the measured data are fitted, which greatly improves the efficiency and accuracy of measurement of the transverse distribution of the wheel path. This is useful in accurately designing the structure of the subgrade and pavement, weakening the development of pavement rutting and cracks, reducing material consumption, and reducing road maintenance frequency. Based on the wheel path transverse distribution characteristics, the damage of the vehicle load on the road structure can be accurately analyzed, so that the design of the subgrade and pavement on a road section or lane can be purposefully performed, thus reducing unnecessary waste and increasing the service life of the roads.

Figure 1:
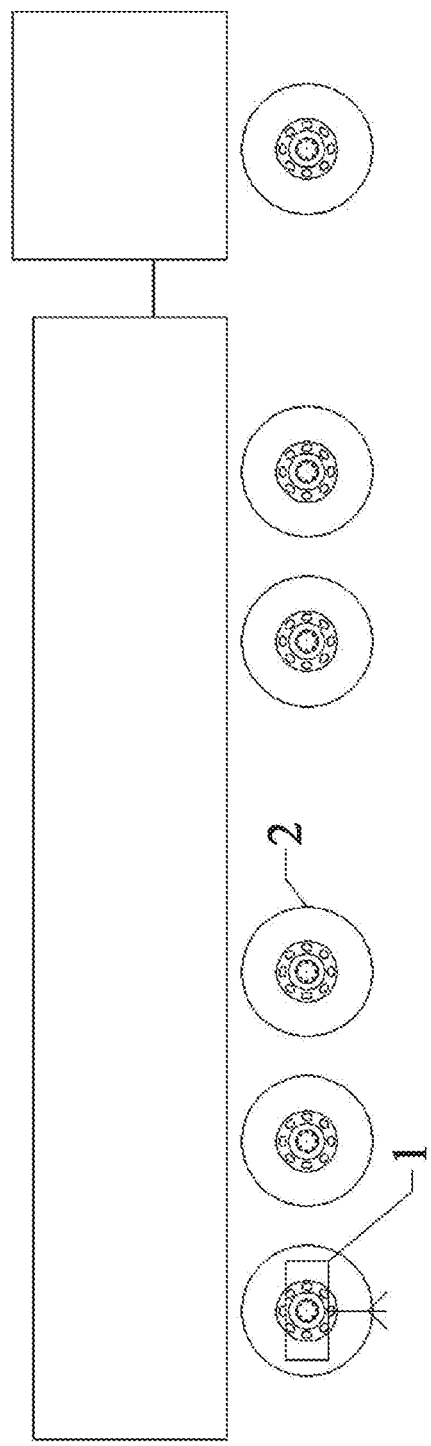
FIG. 1 is a front view of a device and method for measuring transverse distribution of a wheel path according to one embodiment of the disclosure.

In the drawings, the following reference numbers are used: 1. Measurement device of wheel path transverse distribution; 2. Wheel; 3. Axle; 4. Horizontal section of wheel; 5. Laser light beam; 6. Convex; 7. Concave; 8. Hub cavity.

DETAILED DESCRIPTION

To further illustrate, embodiments detailing a device and method for measuring transverse distribution of a wheel path are described below. It should be noted that the following embodiments are intended to describe and not to limit the disclosure.

In this embodiment, a six-axle truck is taken as an example. The measurement device of wheel path transverse distribution of the disclosure comprises a measurement device, a first database, an analysis device, and a second database.

The measurement device is configured to measure the shape and size of one side of the horizontal section of each of a plurality of vehicles, and to measure a distance between one side of the horizontal section of each of the plurality of vehicles and the road shoulder, and to store all of the collected data to the first database.

The first database is configured to store data, measured by the measurement device, of the shape and size of one side of the horizontal section of each of the plurality of vehicles, and of the distance between the one side of the horizontal section of each of the plurality of vehicles and the road shoulder, and raw data of the shape and size of one side of a horizontal section of a plurality of wheels.

The analysis device is configured to analyze the data of the shape and size of one side of the horizontal section of each of the plurality of vehicles and the data of the distance between the one side of the horizontal section of each of the plurality of vehicles and the road shoulder, to obtain transverse distribution of the wheel path of each of the plurality of vehicles.

The second database is configured to store data of the transverse distribution of the wheel path of each of the plurality of vehicles, establish a frequency model of the transverse distribution of the wheel path of each of the plurality of vehicles, determine and output a coefficient of the transverse distribution of the wheel path of the plurality of vehicles, and investigate the influence of the long-term vehicle load on the road surface damage.

Figure 2:
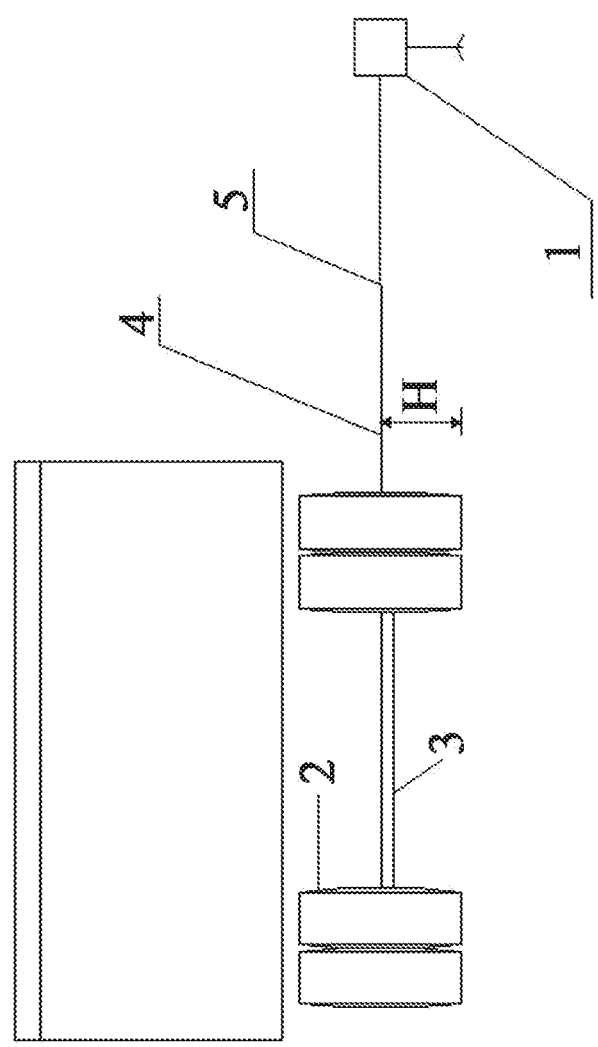
FIG. 2 is a left view of FIG. 1.
Figure 3:
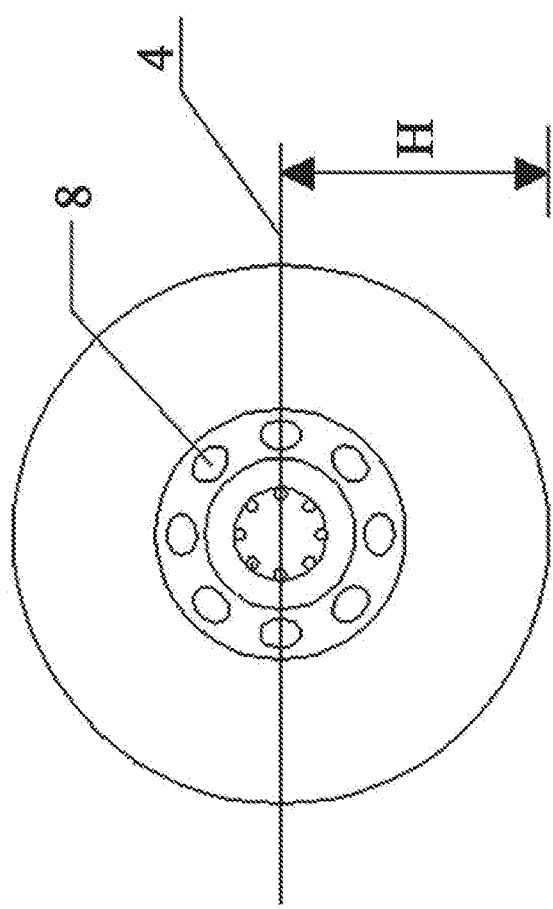
FIG. 3 is a schematic diagram showing a horizontal section of a wheel of a vehicle.

The measurement device comprises an embedded development board, two UHF laser distance sensors, an independent power and a memory, and has the function of inputting, outputting and storing data. As shown in FIG. 1-3, a six-axle truck has six sets of wheels 2 and axles 3. The two UHF laser distance sensors are disposed along the traveling direction on the horizontal line at the same height relative to the roadside. The laser light beam 5 is perpendicular to the traveling direction of the vehicle; H represents a vertical height of the laser emission point to the ground. H is also the height of the bulge of the hubs of the truck relative to the ground. Different trucks have different wheels, so H has a certain range of values. The horizontal section of each of the plurality of vehicles 4 is parallel to the road shoulder and has the same height as the two UHF laser distance sensors. The laser emission point is located at the road shoulder of one side of the horizontal section of the road. The two laser distance sensors simultaneously work and store the obtained data in a first database.

Figure 4:
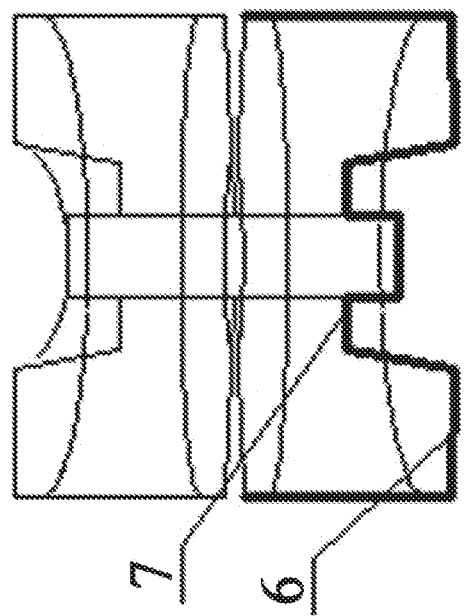
FIG. 4 is a characteristic curve of the concave and concave face of the wheel when two laser distance sensors are scanning over the horizontal section of the wheel.

The axles of the passenger car and the front axles of many trucks cause little damage to the road surface, so that the measurement device only needs distinguishing the two-wheel load-bearing axle of the heavy-duty trucks and other types of axles. The load-bearing axle of the heavy-duty truck requires to support a large weight, so a unilateral double-wheel set is generally adopted. As shown in FIG. 4, in the connection point of the axle 3, one side of the horizontal section of the wheel comprises a convex 6 and a concave 7; the outline of the wheel is in the shape of 'convex-concave-convex-concave-convex'. When installing the two-wheel set of the load-bearing axle of the heavy-duty truck, the concave of the inner wheel faces inward, and the concave of the outer wheel faces outward, so that the outer tire can be easily connected with the axles.

When the vehicle passes, all data of one side of the horizontal section of the vehicle at height H can be detected. The data is in the form of voltage analog signal associated with time and distance. The distance is a distance between the horizontal section of the vehicle and the laser distance sensor, and all the data is saved.

Figure 5:
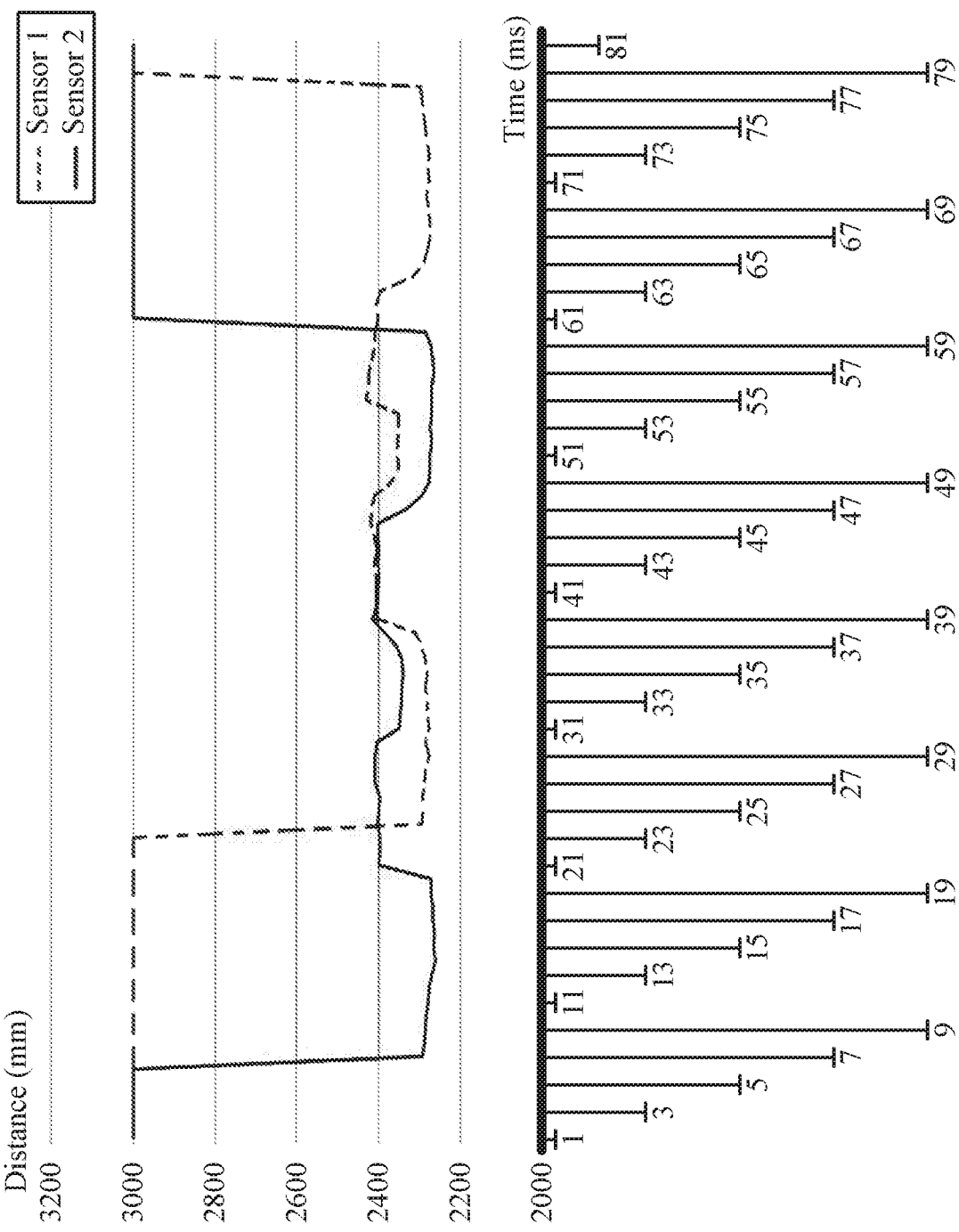
FIG. 5 is a schematic diagram showing a shape (time/distance) of one side of a horizontal section of a wheel acquired by two laser distance sensors.
Figure 6:
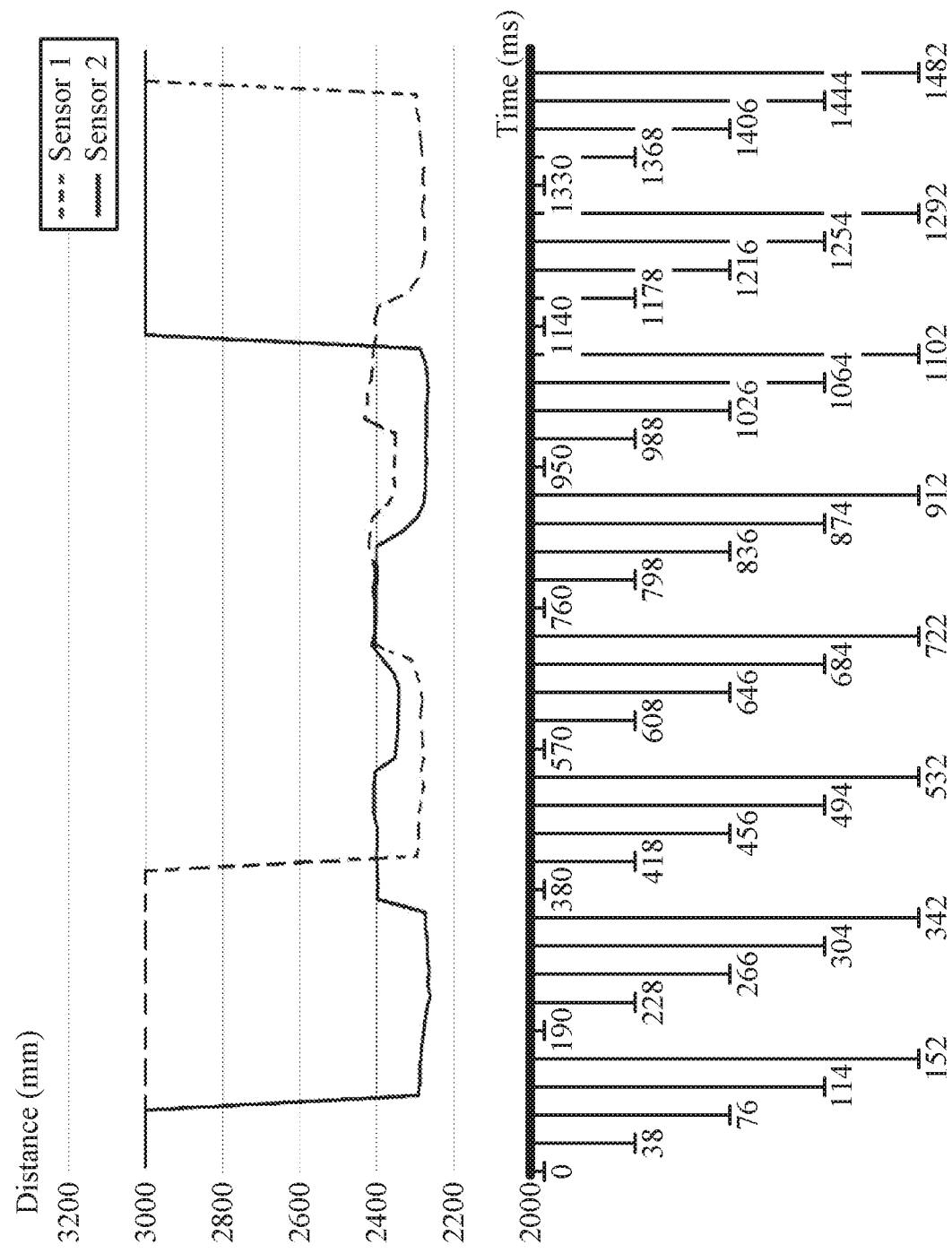
FIG. 6 is a schematic diagram showing a real shape and size (length/distance) on one horizontal side of a wheel based on data recovery according to one embodiment of the disclosure.
Figure 7:
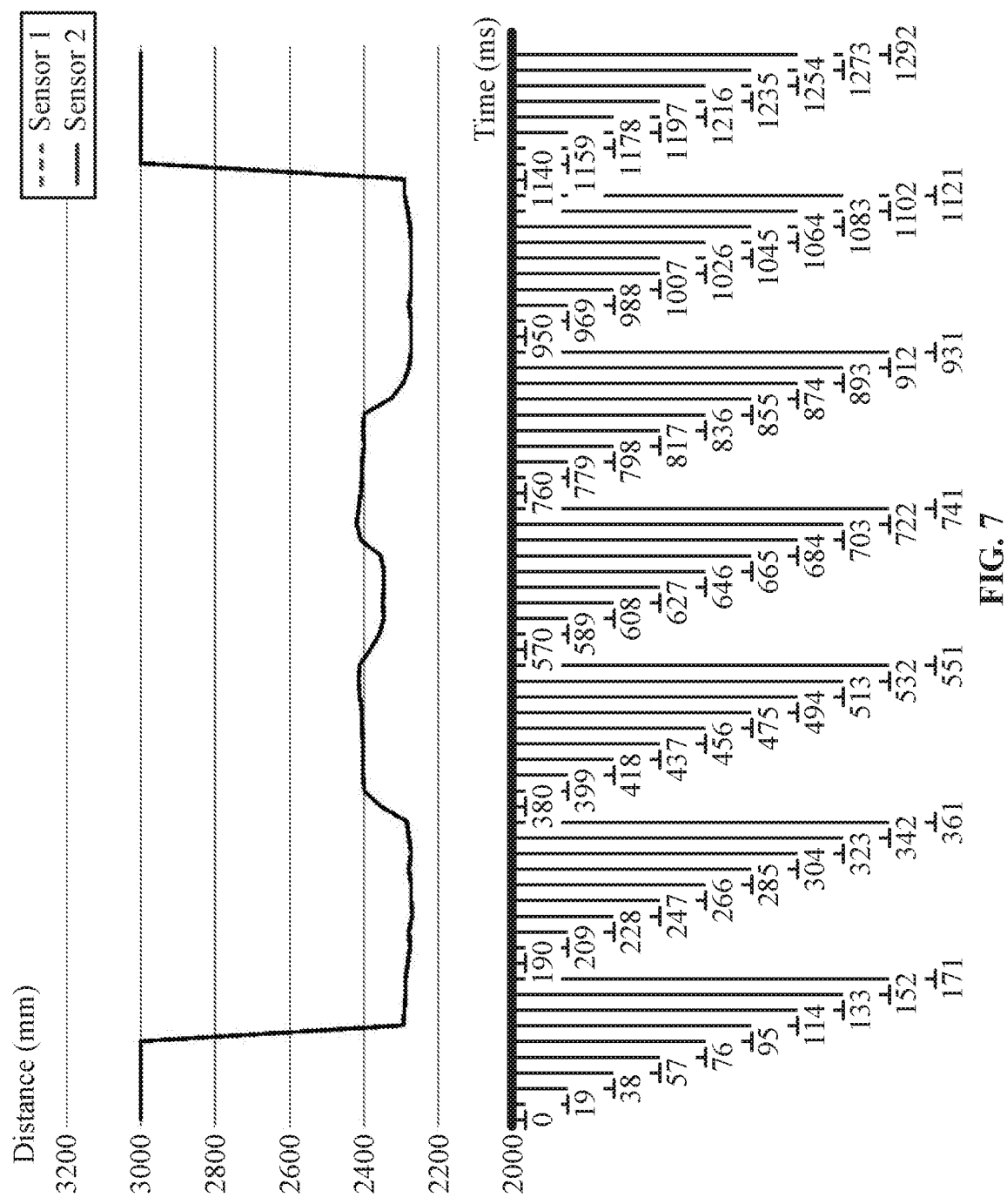
FIG. 7 is a fitted correlation diagram (length/distance) of a real size on one horizontal side of a wheel and a distance from one side of the horizontal section of the wheel to the shoulder according to one embodiment of the disclosure.

The measurement device is configured to preliminarily screen, process and output data. The preliminary screening means that only selecting the valid sample data within a certain target; the data processing refers to fit the raw data collected by the two UHF laser distance sensors by calculating the vehicle speed V, and convert the data from the distance-time (D-T) correlation to the distance-length (D-L) correlation, that is, restore the real shape and size characteristic data from one side of the horizontal section of the vehicle and storing the processed data in the first database. FIG. 5 is a schematic diagram showing the shape (time/distance) of one side of the horizontal section of the wheel when two laser distance sensor scans; FIG. 6 is a schematic diagram showing the real shape and size (length/distance) on one horizontal side of the wheel; FIG. 7 is a schematic diagram showing the distance between one side of the horizontal section of the wheel and the road shoulder correlates to one side of horizontal section of the wheel after data fitting (length/distance).

The first database comprises three parts: a first area, a second area and a third area; the first area is a target vehicle database comprising the effective sample data of the shape and size of the one side of the horizontal section of each of the plurality of vehicles and the distance between the one side of the horizontal section of each of the plurality of vehicles and the road shoulder; the second area is a raw database comprising the shape and size of one side of the horizontal section of a plurality of wheels; the third database is a target wheel database comprising data of the shape and size of one side of the horizontal section of wheels of the plurality of vehicles selected from the first area; the data from the second database is updated by the data from the third database; and the data of the first area and the second area are available to the analysis device.

Figure 8:
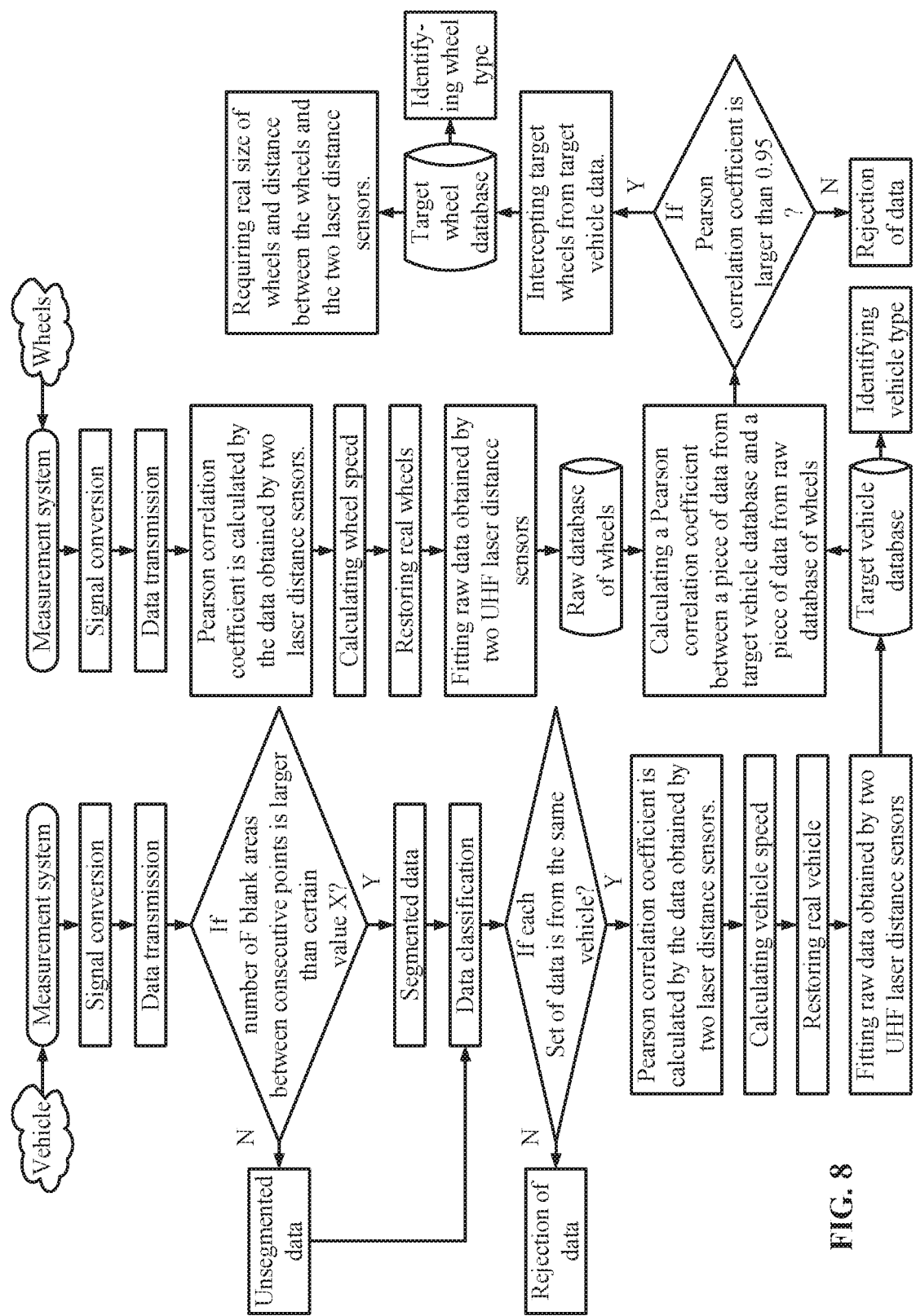
FIG. 8 is a flowchart of a method for measuring a transverse distribution of a wheel path according to one embodiment of the disclosure.

As shown in FIG. 8, the method for measuring the transverse distribution of the wheel path is summarized as follows:

1) The measurement device measures the shape and size of one side of the horizontal section of the vehicle and the distance between one side of the horizontal section of the vehicle and a laser distance sensor.

2) Vehicle identification: complete analog signal voltage data is identified, which is implemented as follows: first, the data received by the two laser distance sensors is simultaneously processed; if the number of blank areas between consecutive points in the analog signal voltage data is larger than a certain value X, preliminarily screen the target vehicle and divide the data into segments; second, classify the data according to a range of blank areas, then determine whether or not each set of data is from the same vehicle in combination with the distance from the data point to the laser distance sensor; if the number of blank areas between consecutive points in the analog signal voltage data is less than a certain value X, classify the data according to a range of blank areas, and determine whether or not each set of data is from the same vehicle in combination with the distance from the data point to the two laser distance sensors, where the blank area refers to the time when the measurement device receives no signal.

3) Speed calculation: after the vehicle is identified, for one vehicle, the Pearson correlation coefficient is calculated by the two groups of data obtained in two laser distance sensors when the one vehicle passes. When the correlation coefficient is larger than 0.85, the speed is calculated as follows: the first $1/10$ and the last $1/10$ of a vehicle's analog signal voltage data obtained by the two laser distance sensors is simultaneously selected and compared; when the data length in the two sets is not equal, the longer one is selected as the standard, and if the data is consistent, and the Pearson correlation coefficient is calculated; for the data of the same vehicle, the first $1/10$ and the last $1/10$ each have a correlation coefficient; if there is a coefficient larger than 0.85 in the first $1/10$ or the last $1/10$, it is considered that the two sets data of the vehicle are consistent, and the speed can be calculated. If the correlation coefficient of the first $1/10$ and the last $1/10$ of a vehicle is less than 0.85, or does not exist, calculate according to the following method: starting from the data of the first position, the first set of non-blank area data with a length larger than 45 in the two sets of data is selected; if the two sets of data are available and the data of the two sets differ by less than 3 points, the Pearson correlation coefficient is calculated according to the length of the shorter data set; the speed is calculated only when the coefficient >0.85, otherwise it is not calculated.

The speed is calculated as follows: the horizontal distance S between the two laser distance sensors and the time interval $\Delta t$ of acquiring the first data by the two laser distance sensors are obtained, and the vehicle speed V is calculated according to the formulation $V=S/\Delta t$. Thereafter, the data between distance and time (D-T) is converted into data between distance and length (D-L), thus acquiring the real shape and size of one side of the horizontal section of the vehicle, and identifying the vehicle classification by the number of axles and the length of the vehicle. The above data together with the distance data between one side of the horizontal section of the vehicle and two laser distance sensors are stored in the first database as the target vehicle database (can be used to detect the vehicle speed according to different vehicle classification).

The target vehicle database is two-dimensional data; the abscissa is the length, and the ordinate is the distance; the time interval of the signals separately received by the two laser distance sensors and the vehicle speed are multiplied, to yield the real shape and size data of one side of the horizontal section of the vehicle. The data is fitted and associated with the distance between one side of the horizontal section of the vehicle and the two laser distance sensors.

After the conversion, the graph in which the horizontal axis is time (unit: ms) and the vertical axis is distance (unit: mm) is converted into the graph in which the horizontal axis is length (unit: mm) and the vertical axis is distance (unit: mm), as shown in FIG. 5 and FIG. 6. The obtained data is the coordinates of the real two-dimensional plane which does not correspondingly scale with the vehicle speed. And the coordinates of the two-dimensional plane are the real shape and size on one side of the horizontal section of the wheel which associates with the distance between one side of the horizontal section of the wheel and the road shoulder. Finally, the data transformed by the two laser distance sensors is fitted to obtain a more realistic two-dimensional data in which the shape and size data of one side of the horizontal section of the wheel associates with the distance data between one side of the horizontal section of the wheel and the road shoulder, as shown in FIG. 7.

4) Create a raw wheel database: the raw wheel data is stored in the first database; the raw wheel data is the real shape and size data of one side of a horizontal section of a wheel that visually has a characteristics of 'convex-concave-convex-concave-convex'; the raw wheel data is two-dimensional data; the abscissa is the length, and the ordinate is the distance. The raw database of wheels is obtained in a laboratory following the method of establishing the target vehicle database where it is the wheels not the vehicles that are measured, it will not be described in detail.

5) Wheel identification: the target vehicle database is extracted from the first database and compared with the raw database of wheels to obtain similarity results; the target wheels are acquired from the target vehicle database and automatically stored in the target wheel database; the target wheel data comprises the shape and size of one side of the horizontal section of the wheel and the distance between one side of the horizontal section of the wheel and the two laser distance sensors; the target wheel database is two-dimensional with length as an abscissa and distance as an ordinate.

The target wheels are acquired as follows: calculating a Pearson correlation coefficient between a piece of data from the target vehicle database and a piece of data from the raw database of wheels; when the Pearson correlation coefficient is larger than 0.95, the piece of data from the target vehicle database is intercepted and stored in the target wheel database.

Vehicle classification: based on the number of the wheels and axles identified, the vehicle classification can be obtained.

6) Drawing, based on the target wheel database, a characteristic curve of transverse distribution of wheel path of each of the plurality of vehicles, calculating a coefficient of transverse distribution of the wheel path of each of the plurality of vehicles, acquiring sizes of a tire, rim, spoke and hub of wheels of each of the plurality of vehicles, and storing relevant data in a second database.

As shown in FIG. 3, in view of the distribution of the hub cavity 8 on the hub of the truck, the detection result may be deviated from the standard data. To improve the success rate of data identification, it is necessary to perform blurring processing on parts of the raw data and appropriately reduce the similarity standard.

The feasibility and accuracy of the measurement of the wheel path transverse distribution are demonstrated with two experiments.

Example 1

This experiment was carried out on the No. 3456 section of G15 Shenyang-Haikou Expressway in Guangzhou. In order to ensure the objectivity of the measured data and not affect the normal driving and traffic safety of the vehicle, the measurement device of the disclosure was disposed on one side of the highway where was about 1.5 meters away from the road shoulder; two laser distance sensors were disposed about 960 mm from the ground; the plane where the two laser beams were located was parallel to the road surface, and the two laser beams were perpendicular to the direction of travel of the vehicle. For data comparison, a DV camera was placed on the right side of the measurement device and at a distance of 9 meters from a line perpendicular to the laser beams for recording the vehicle classification of the passing vehicle; a radar speed measurement device was disposed in the immediate vicinity of the DV camera, and the radar speed measurement device measured the vehicle speed at an angle of 15° with the direction of travel of the vehicle; this experiment took 25 minutes as the complete measurement time at each time period, and the DV camera was always in the recording state for 25 minutes. When a vehicle passes, the radar speed measurement device started to measure and record, and the laser vehicle detection device also started recording data.

After the measurement experiment was completed, firstly look back at the video, sort the vehicle, record the vehicle classification and the time point when the vehicle passes the measured section; secondly, read the vehicle speed recorded by the radar speed measurement device and associate the vehicle speed to the vehicle classification and time; then, the vehicle was identified according to the method of the disclosure (the target vehicle data was obtained through vehicle identification, speed calculation and vehicle classification, and the number of axles was determined by the number of wheels having a characteristics curve of 'convex-concave-convex-concave-convex' on one side of the horizontal section of the wheel); finally, the survey crew compared the vehicle classification and vehicle speed data obtained by the DV camera and the radar speed measurement device with that obtained by the disclosure to prove the accuracy, feasibility and advancement of the disclosure.

The heavy-duty truck passing in 25-minute testing period were sampled, and the collected data and the comparison results are shown in Table 1.

The actual measure map was the real shape and size characteristic data of one side of the horizontal section of the vehicle restored by using the method of the disclosure, and the number of axles was determined by the wheel having the characteristic curve of 'convex-concave-convex-concave-convex' in the actual measure map, to perform the vehicle classification identification.

As shown in Table 1, the number of axles and the vehicle classification obtained by the device and the method of the disclosure are consistent with the number of axles and the vehicle classification obtained by the DV and radar speed measurement device, and the ratio between the speed obtained by the radar speed measurement device and the disclosure is about 1:1.014, which shows that the disclosure realizes speed detection and automatic vehicle classification identification.

Example 2

The arrangement of the measurement device of the disclosure was as in Example 1; a high resolution camera with a wide angle was disposed about 5 m to the right of the measurement device of the disclosure for photographing the specific position of the last one of the right rear wheels rolling over when the vehicle was traveling in the slow lane, that is, the wheel path transverse distribution, and the shape and size characteristics of the wheel.

The experiment was also carried out for a time length measured in 25 minutes. The high-resolution camera with a wide angle was in the recording state for 25 minutes, and the measurement device of the present disclosure began recording data when a vehicle passed.

After the measurement experiment was completed, firstly look back at the video, sort the vehicles, record the vehicle classification and the time point when the vehicle passed the measurement position; secondly, the shape and size data of the vehicle were obtained according to the method of the disclosure, the target vehicle data was obtained through vehicle identification and speed calculation, and then the wheel path transverse distribution characteristic was determined by taking points.

The heavy-duty truck passing in 25-minute testing period were sampled, and the collected data and the comparison results are shown in Table 2.

TABLE 1

Figure 9:
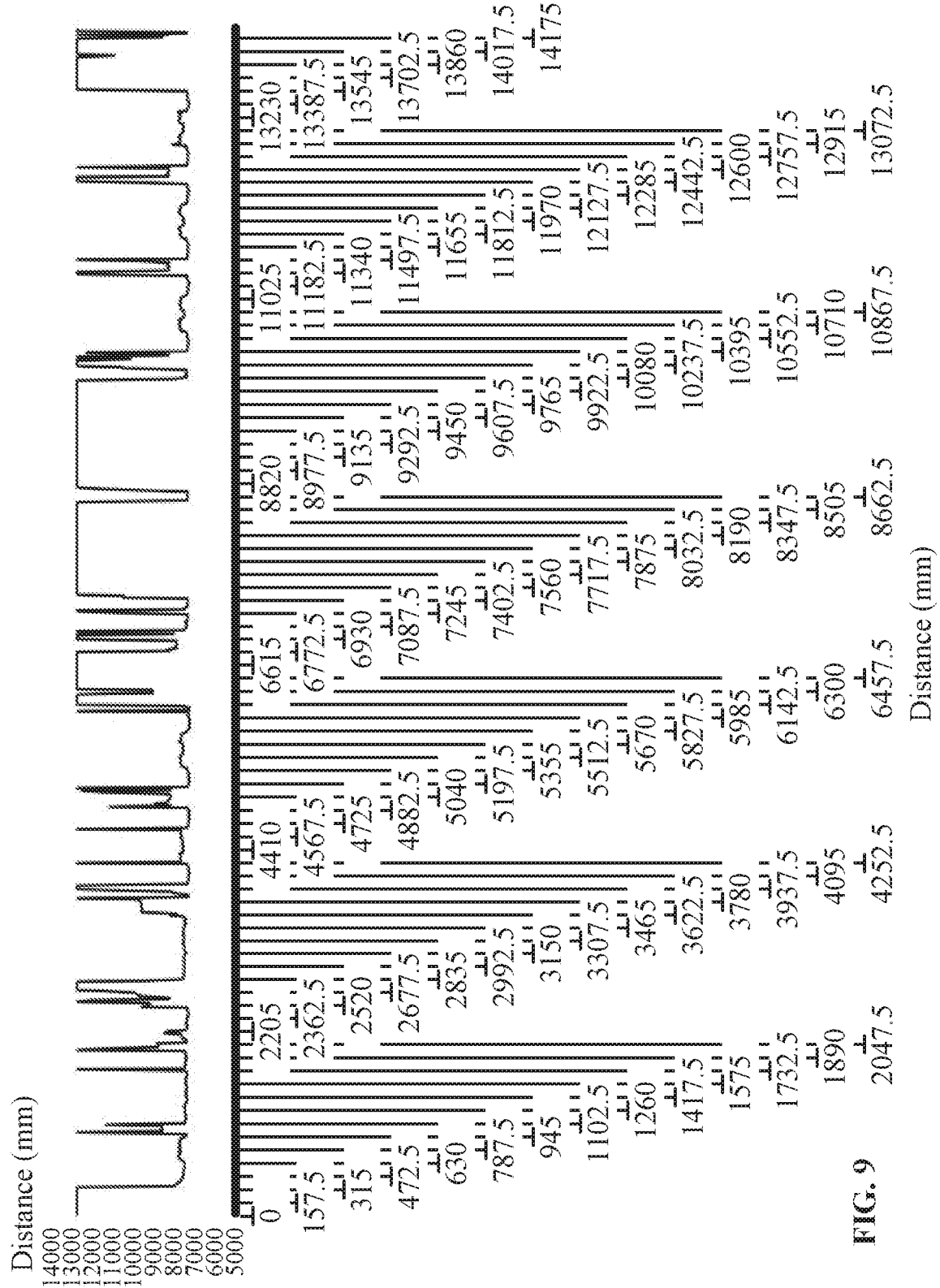
FIGS. 9-18 are measured drawings of wheels of vehicles in Example 1.
Figure 10:
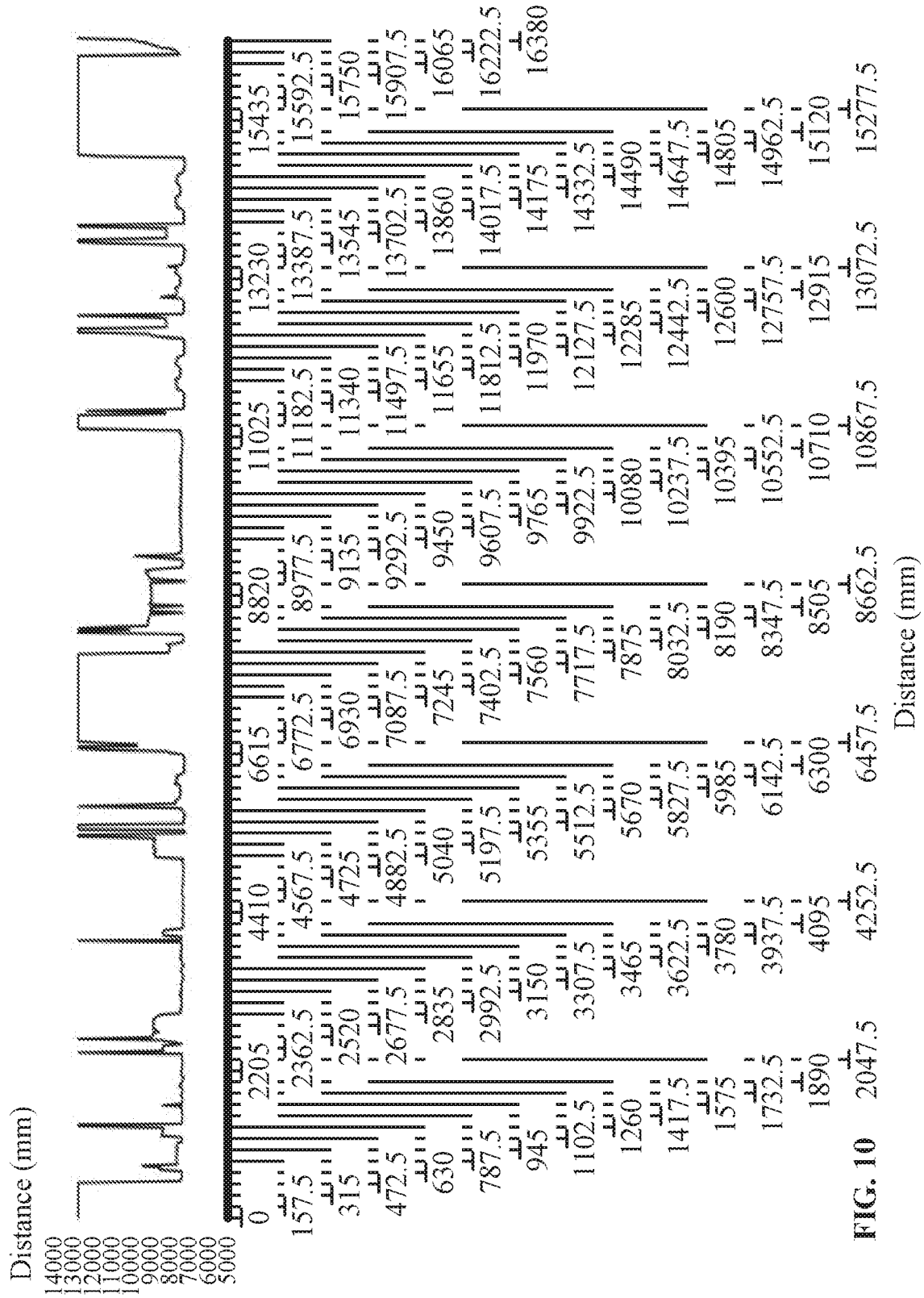
Figure 11:
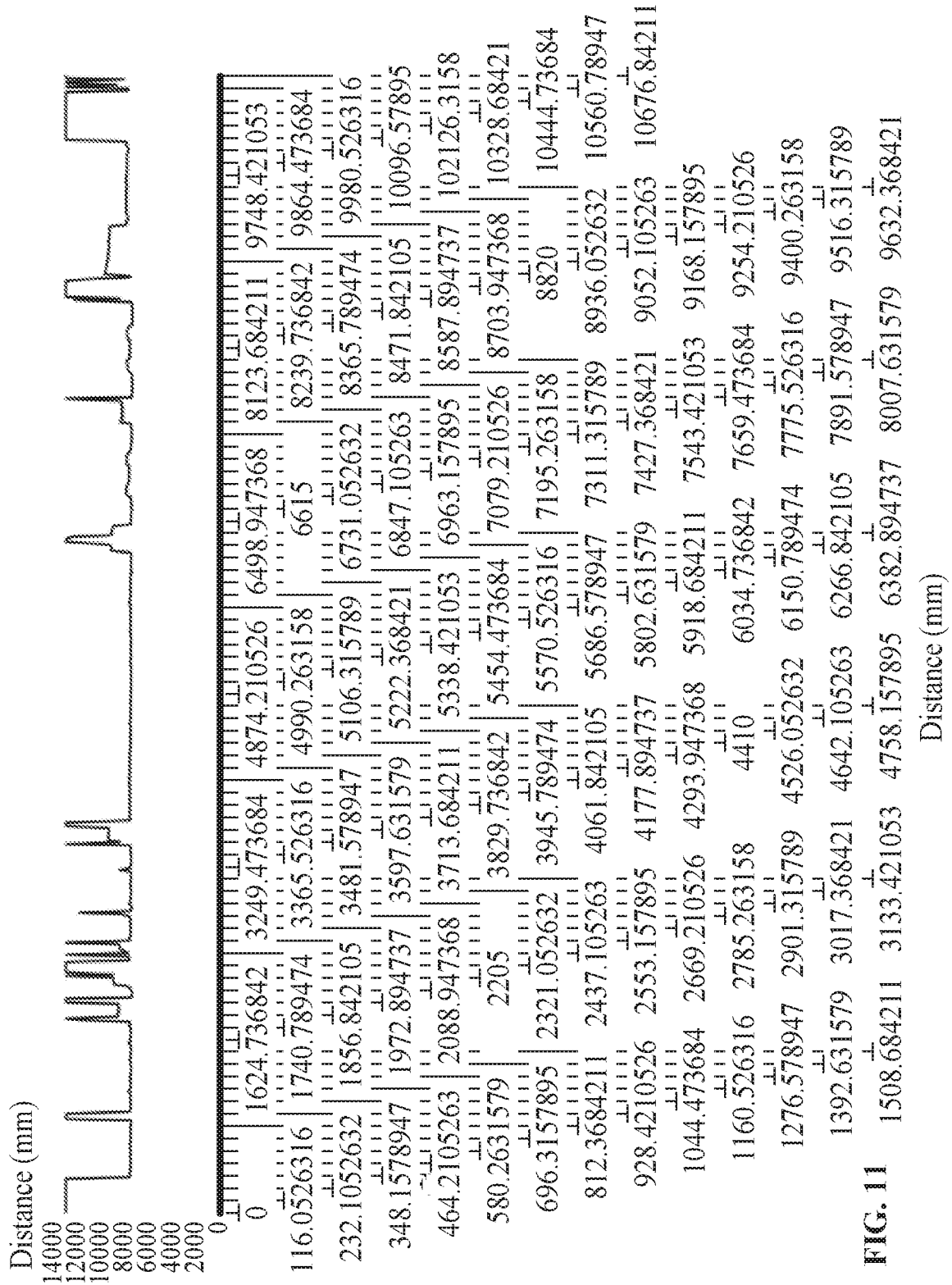
Figure 12:
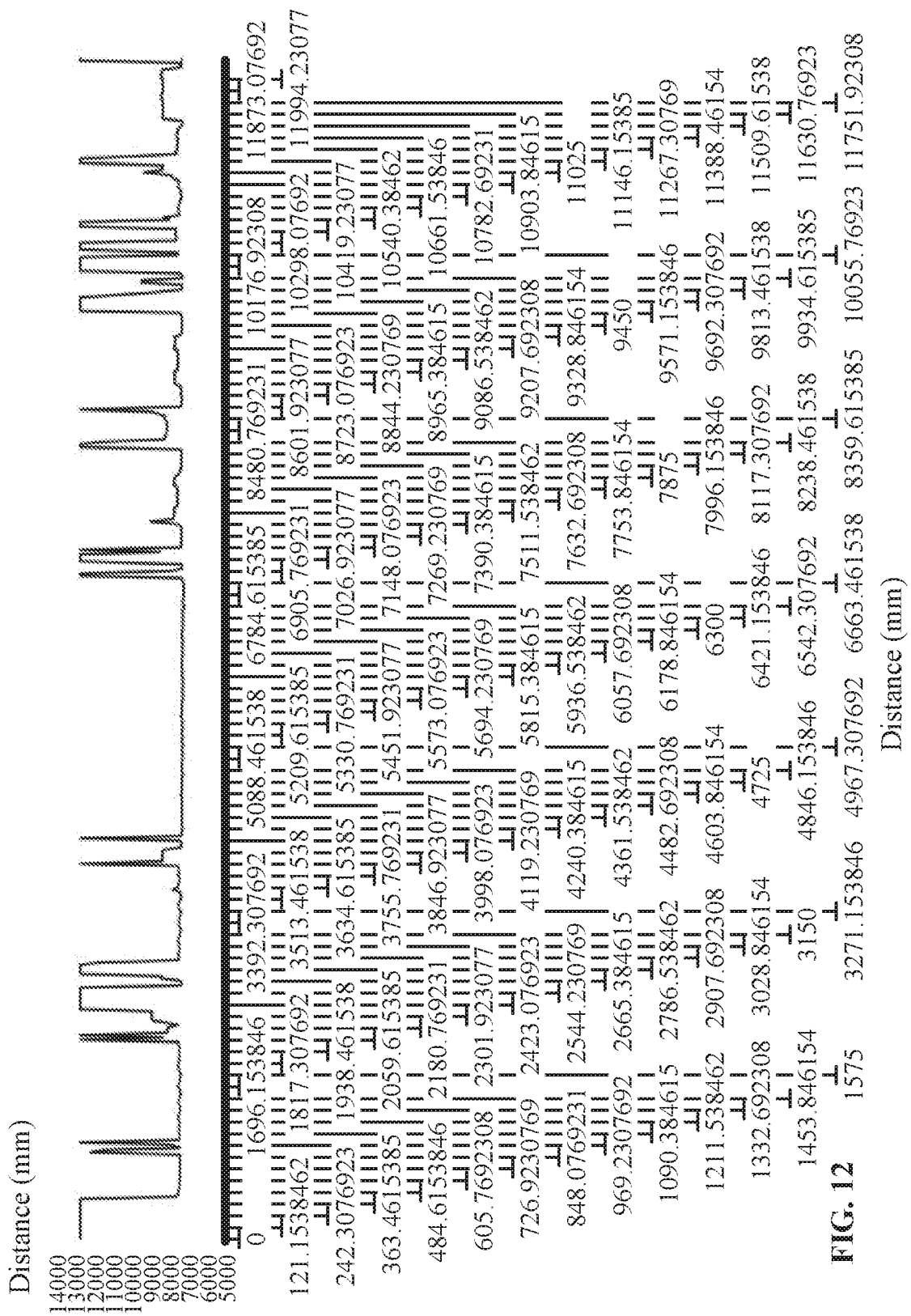
Figure 13:
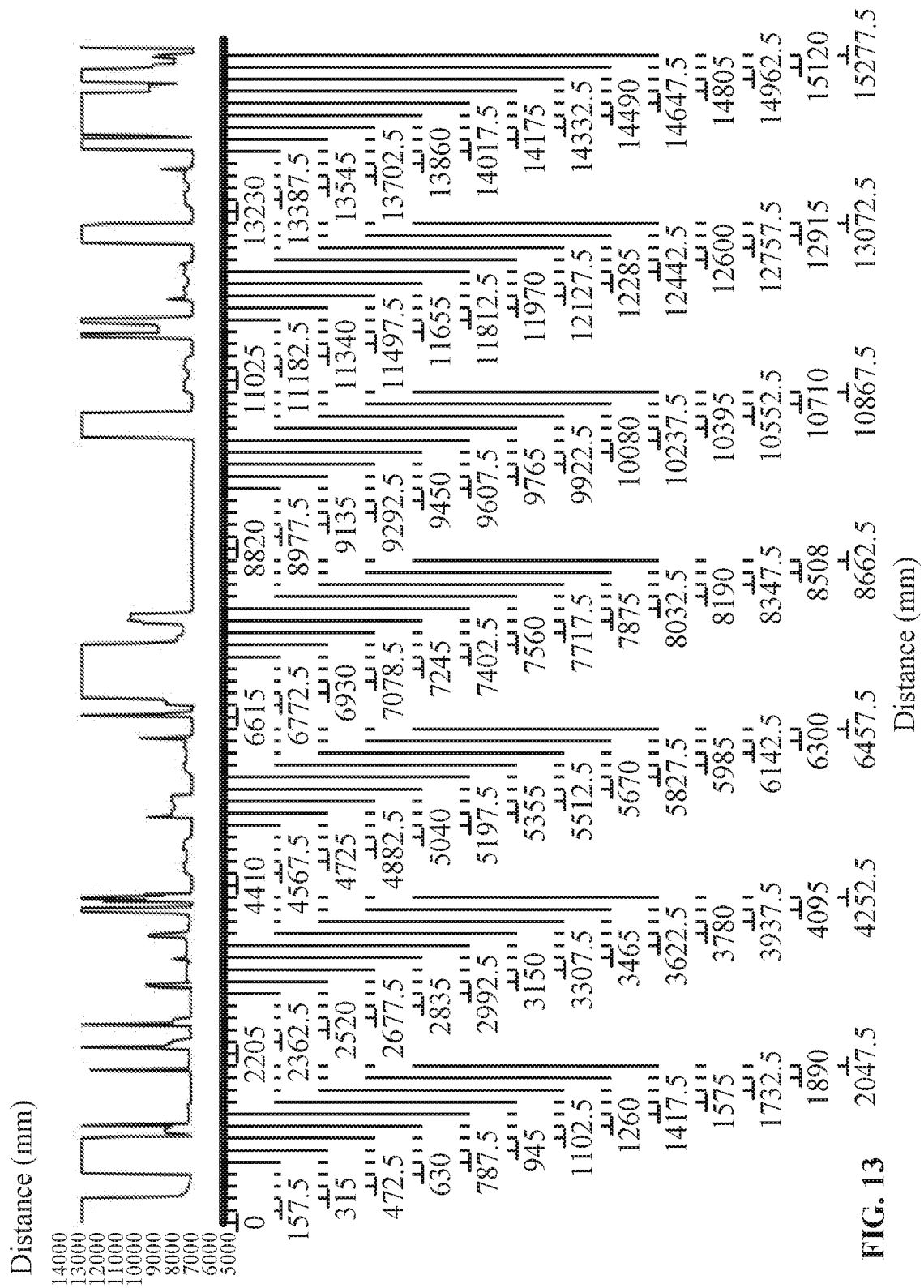
Figure 14:
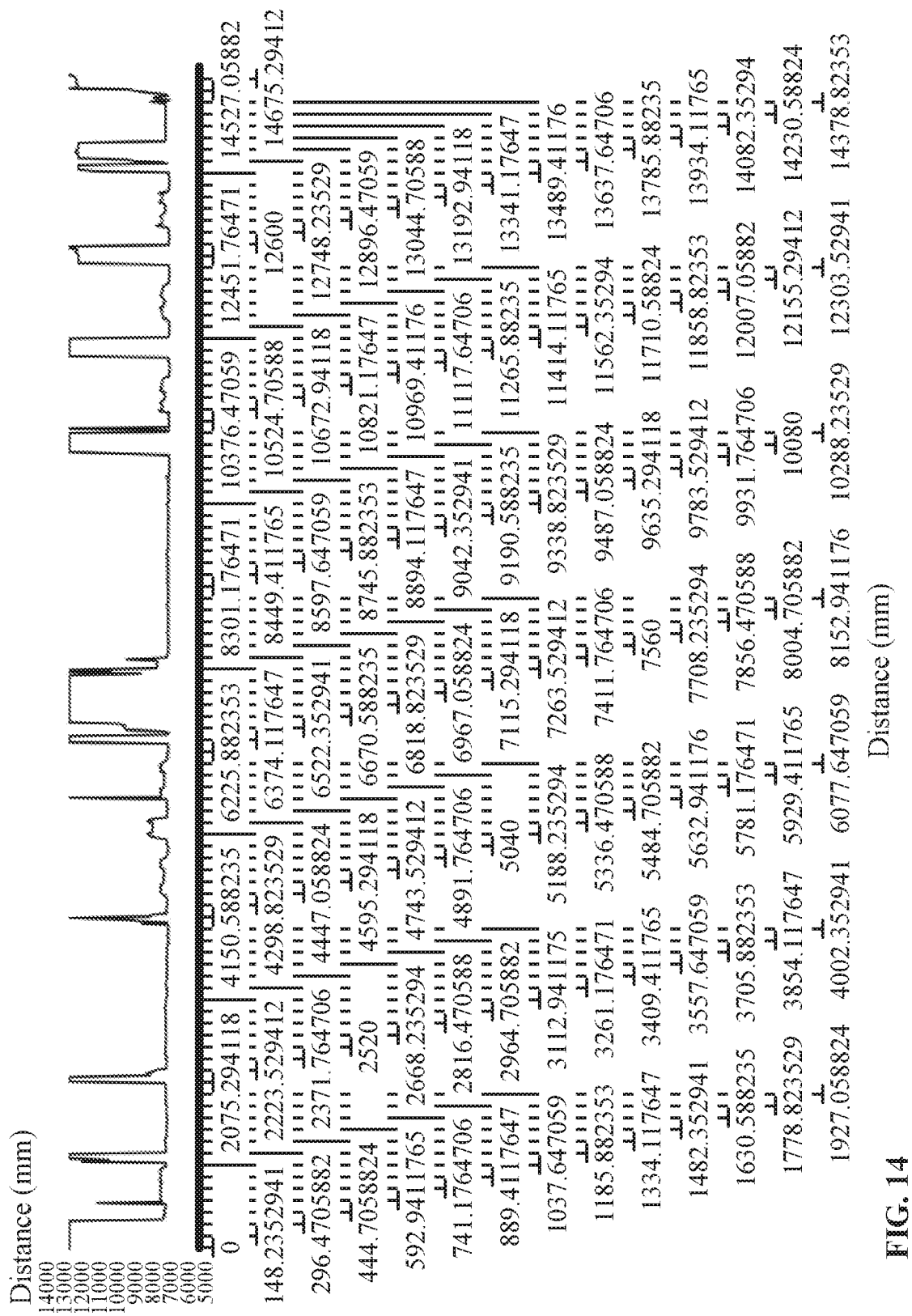
Figure 15:
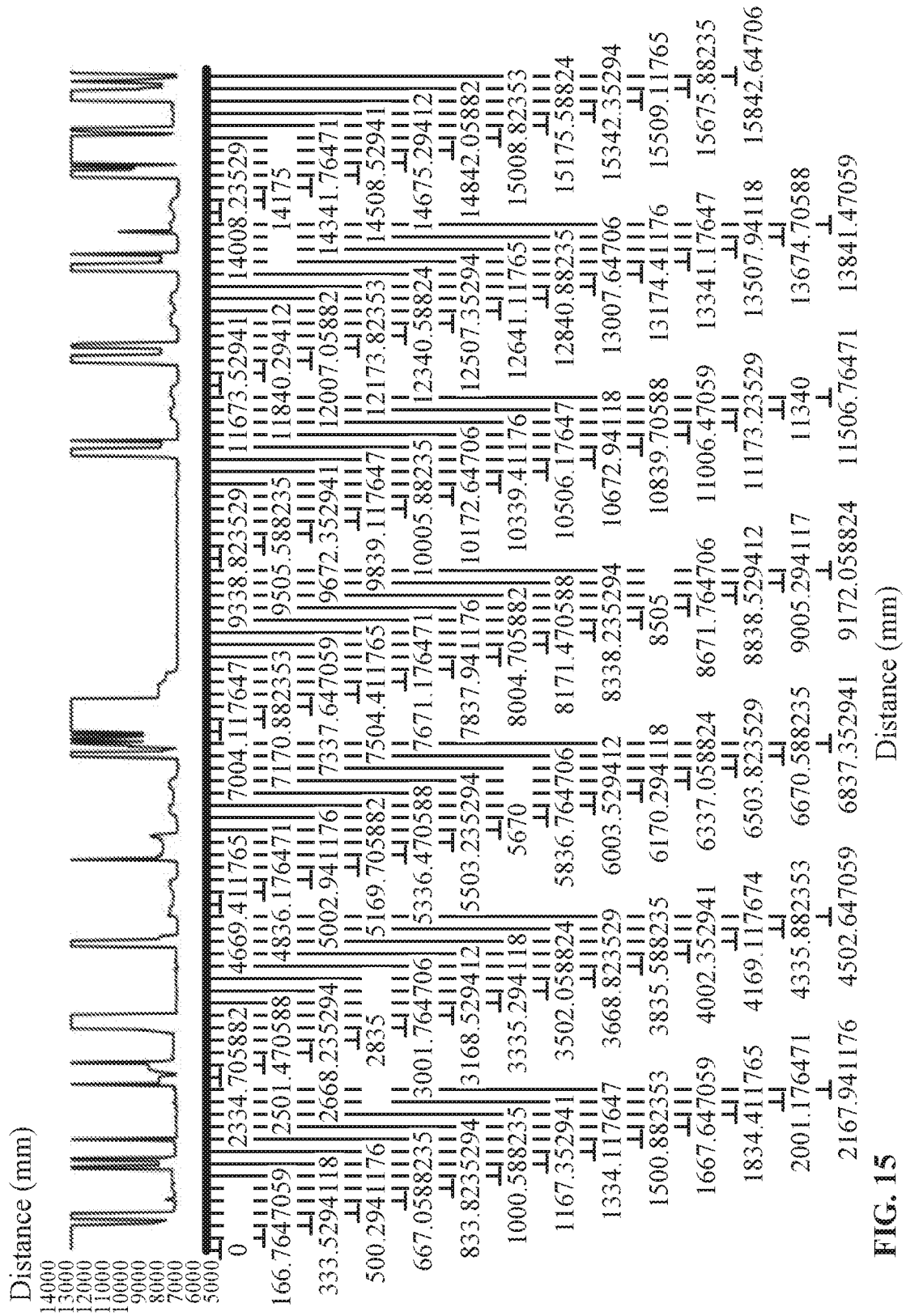
Figure 16:
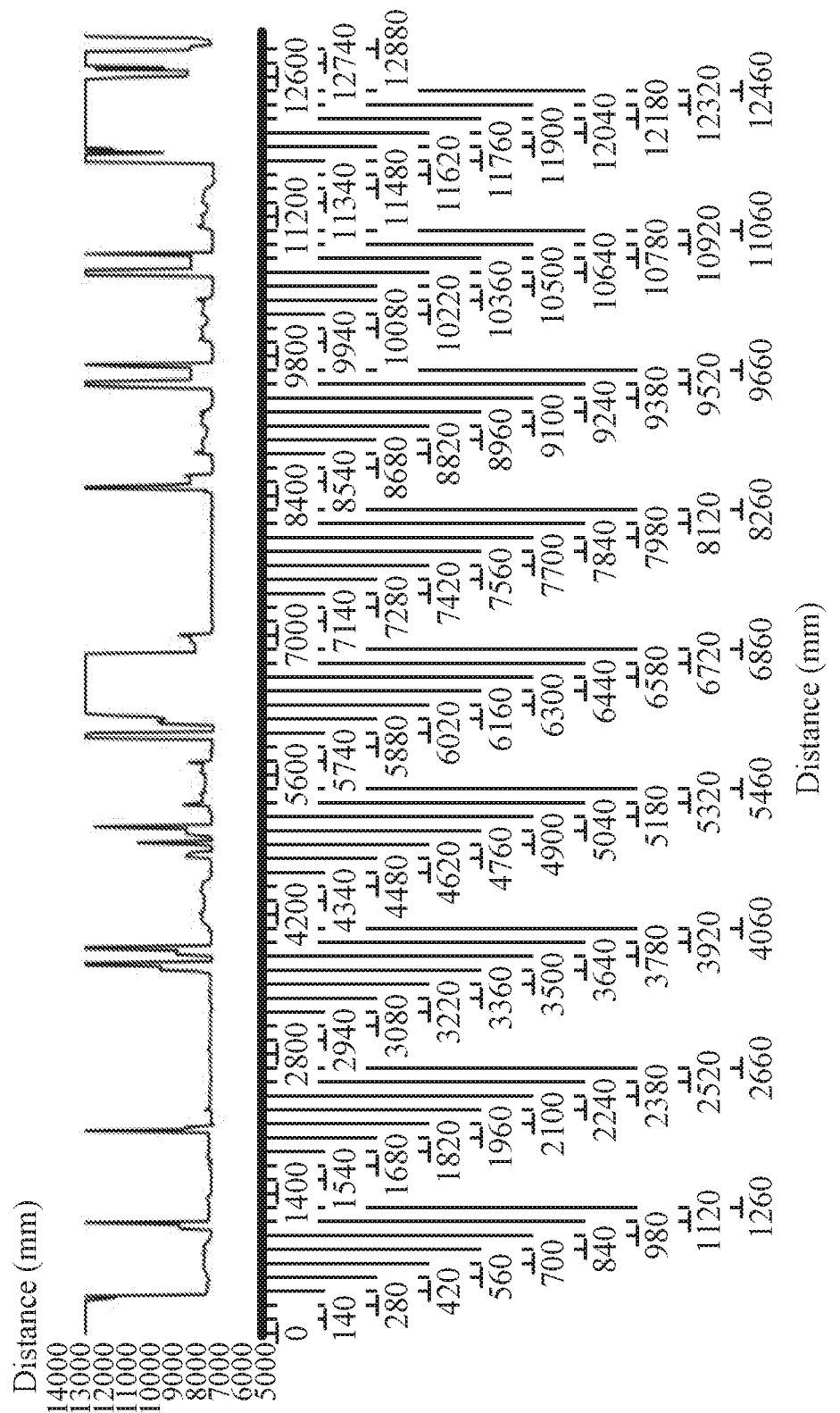
Figure 17:
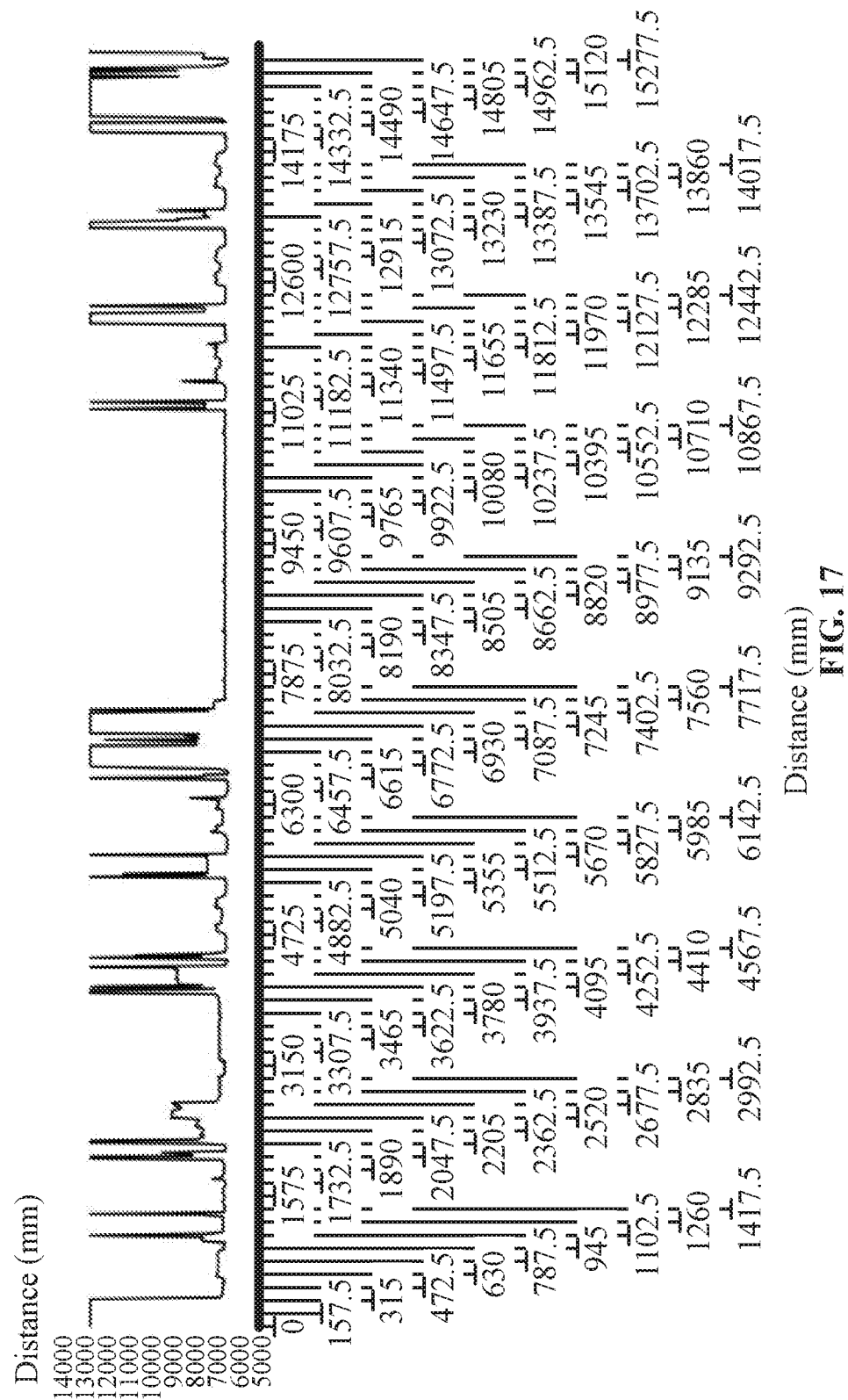
Figure 18:
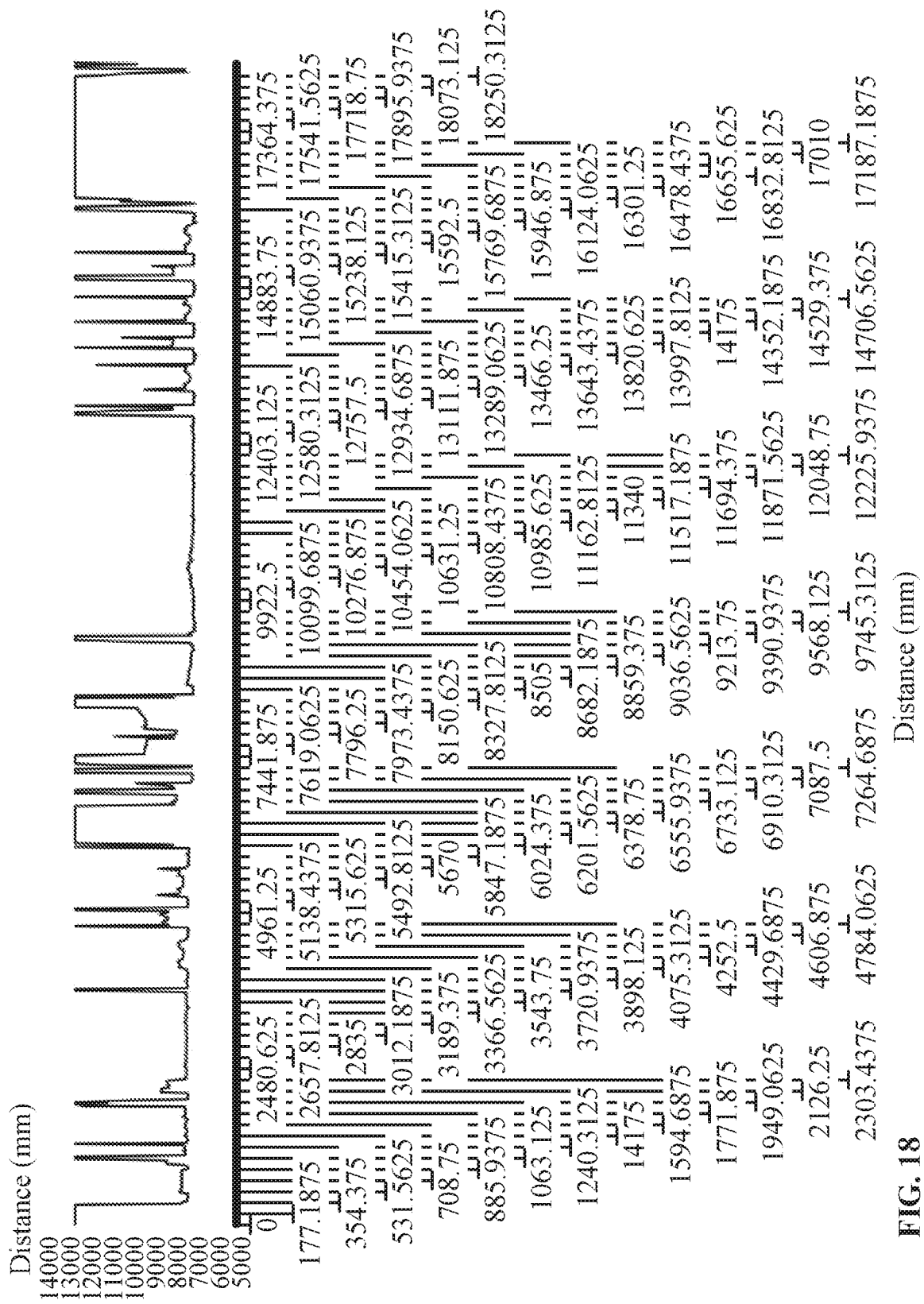

| | The disclosure | | | | DV and radar speedometer | | |
|---|---|---|---|---|---|---|---|
| Vehicle No. | Measured drawings | Vehicle speed (km) | Axle number | Vehicle class | Vehicle speed | Axle number | Vehicle class |
| 1 | FIG. 9 | 56.7 | 6 | VC 9 | 57 | 6 | VC 9 |
| 2 | FIG. 10 | 70.875 | 6 | VC 9 | 71 | 6 | VC 9 |
| 3 | FIG. 11 | 59.684 | 4 | VC 6 | 60 | 4 | VC 6 |
| 4 | FIG. 12 | 87.231 | 4 | VC 6 | 88 | 4 | VC 6 |
| 5 | FIG. 13 | 63 | 6 | VC 9 | 63 | 6 | VC 9 |
| 6 | FIG. 14 | 66.706 | 6 | VC 9 | 67 | 6 | VC 9 |
| 7 | FIG. 15 | 66.706 | 6 | VC 9 | 67 | 6 | VC 9 |
| 8 | FIG. 16 | 63 | 6 | VC 9 | 63 | 6 | VC 9 |
| 9 | FIG. 17 | 63 | 6 | VC 9 | 63 | 6 | VC 9 |
| 10 | FIG. 18 | 70.875 | 6 | VC 9 | 71 | 6 | VC 9 |

TABLE 2

Figure 19:
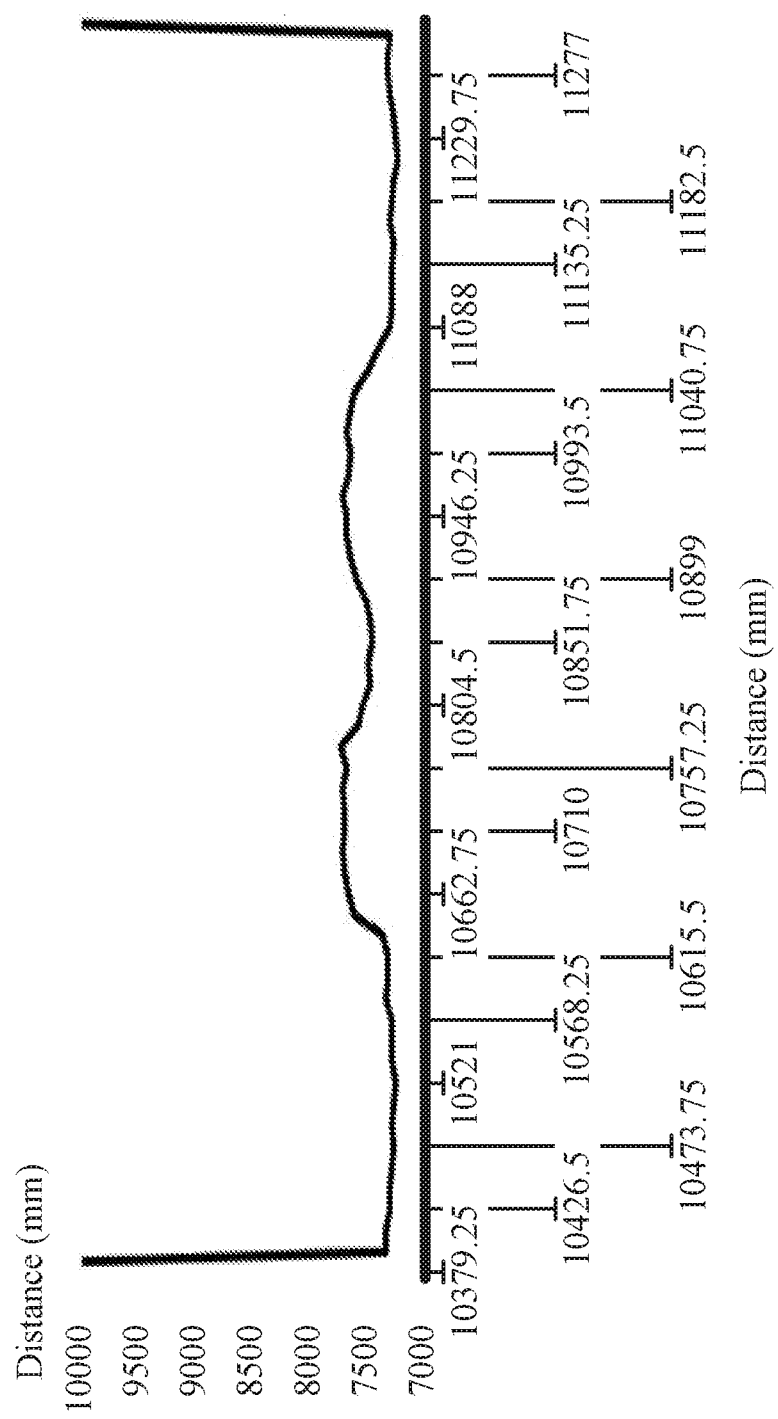
FIGS. 19-28 are measured drawings of wheels of vehicles in Example 2.
Figure 20:
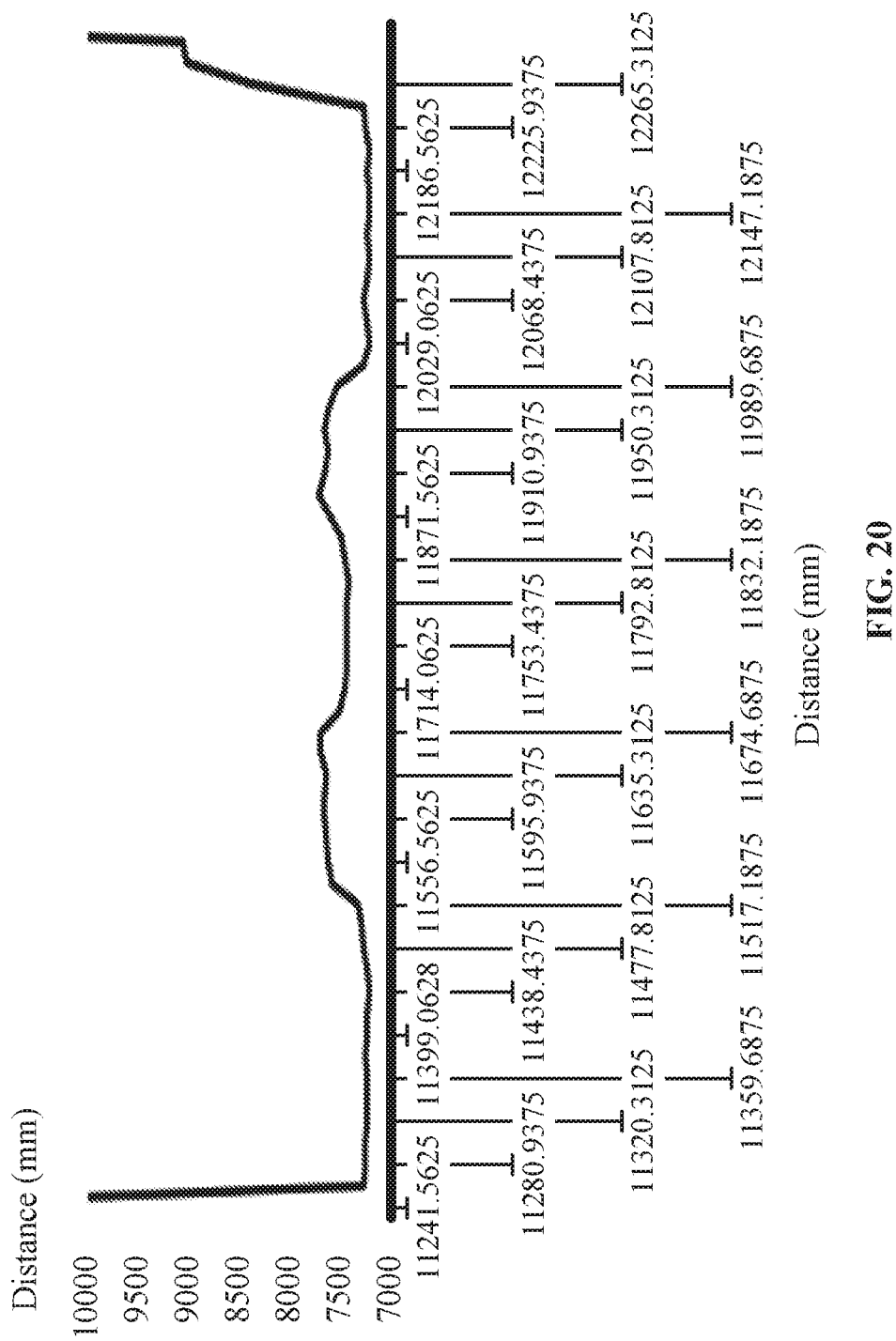
Figure 21:
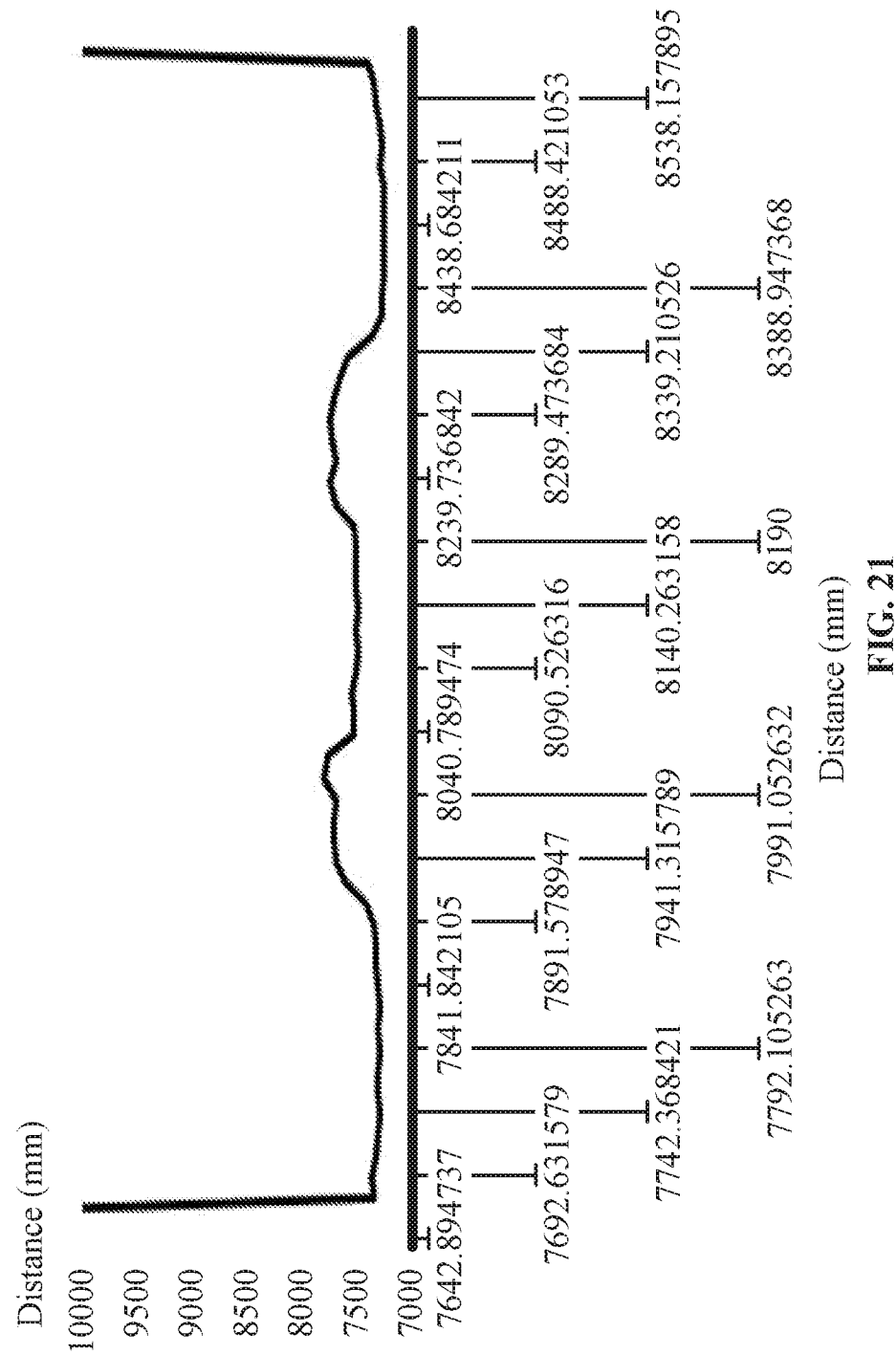
Figure 22:
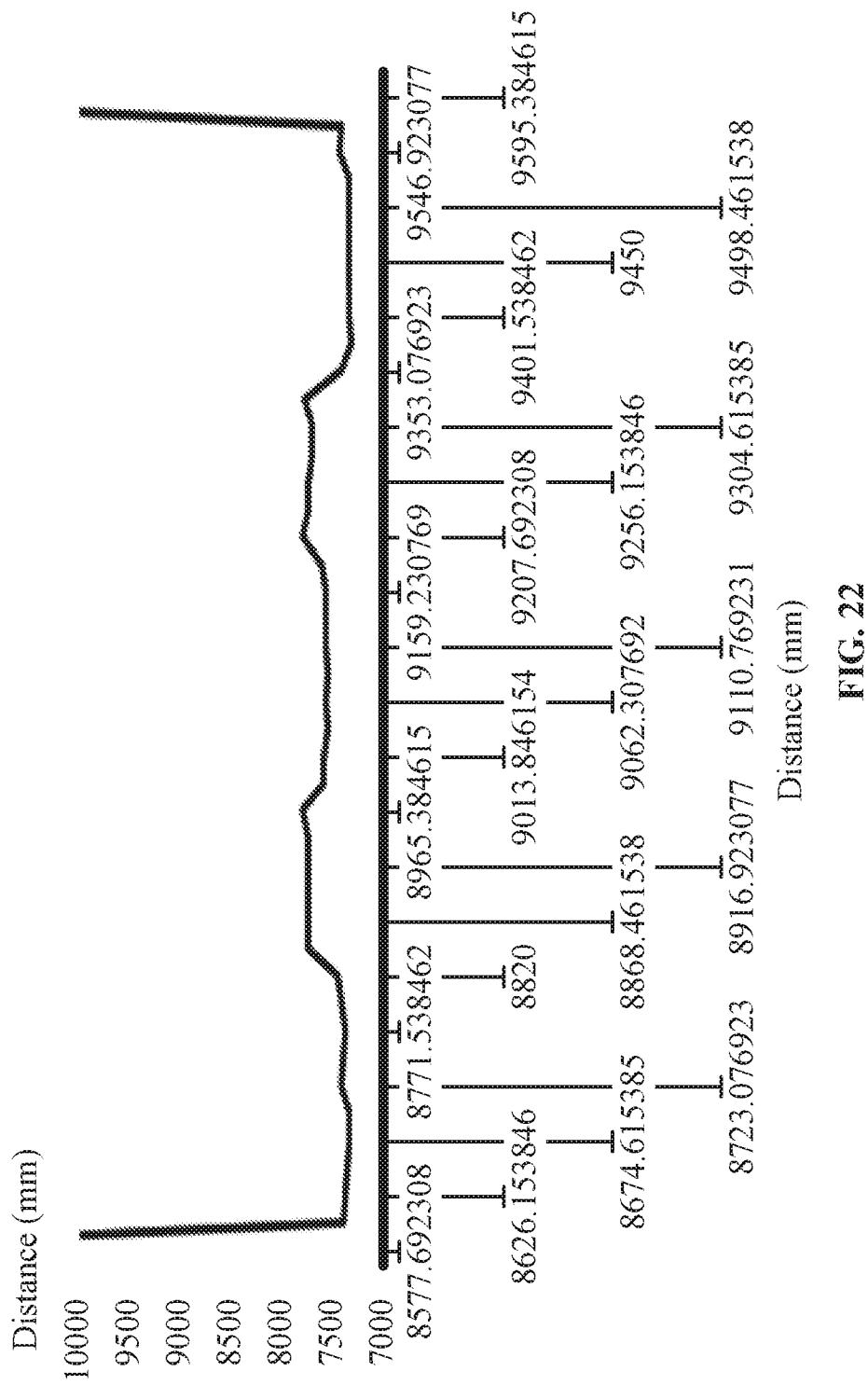
Figure 23:
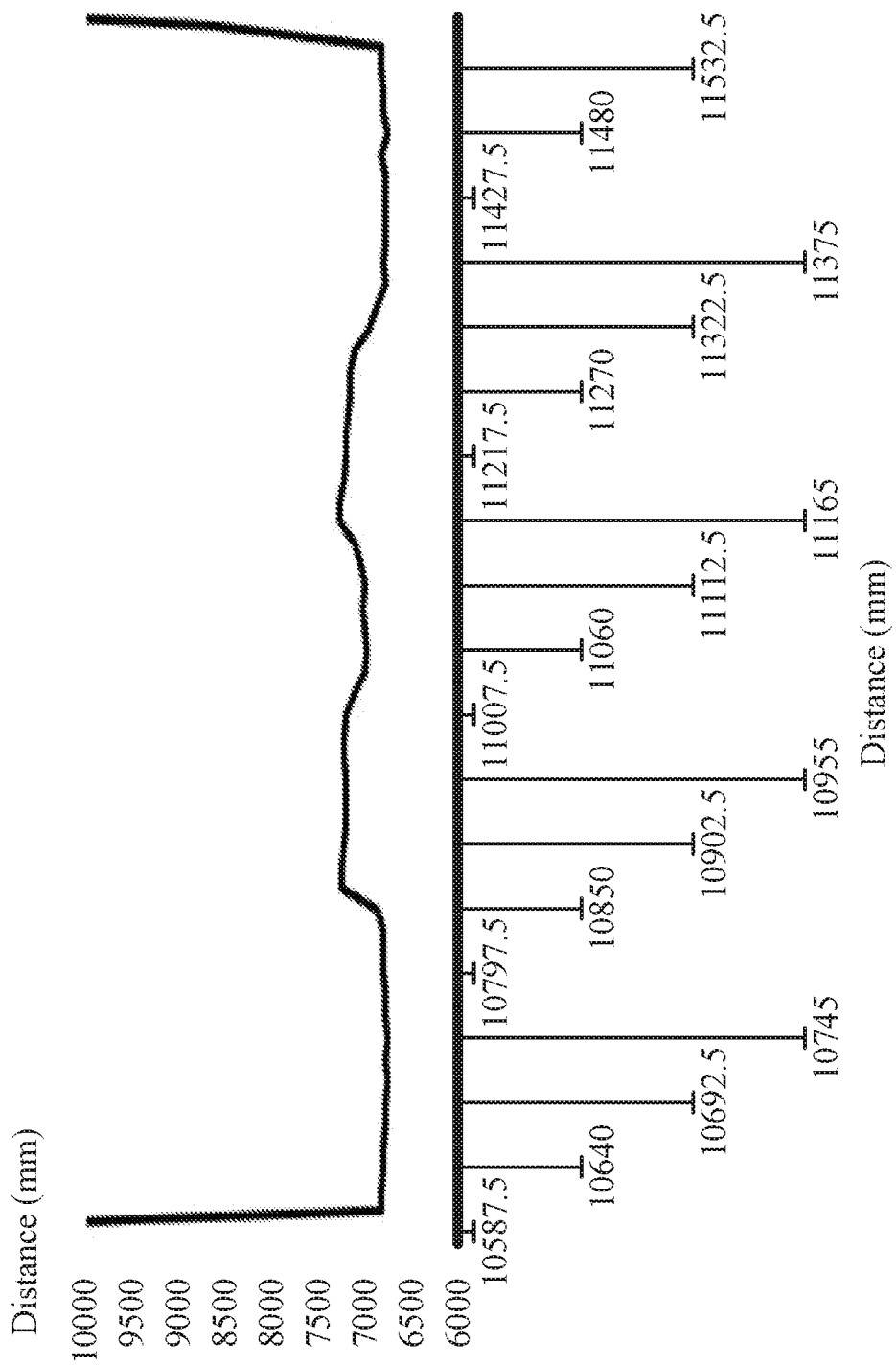
Figure 24:
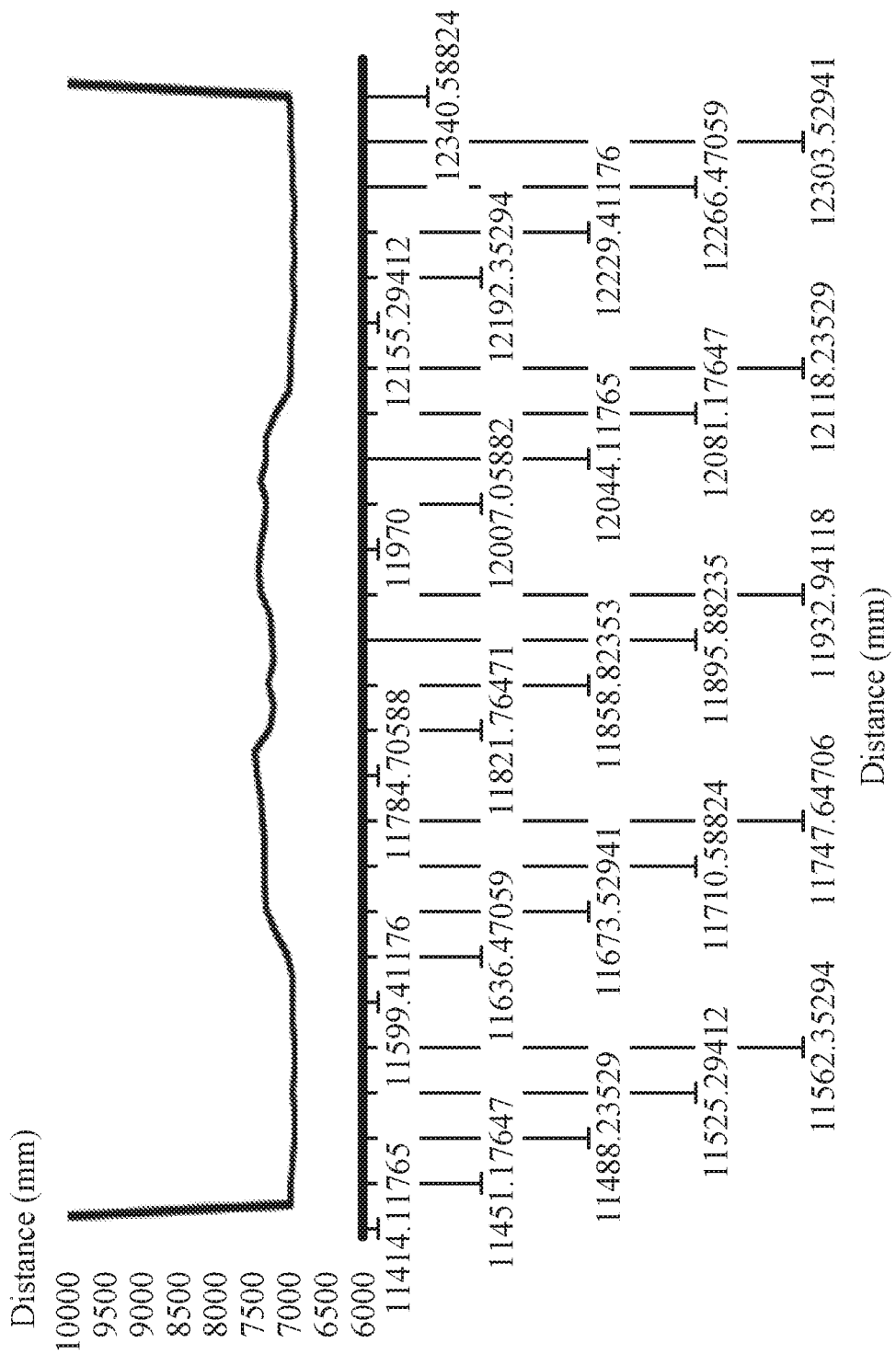
Figure 25:
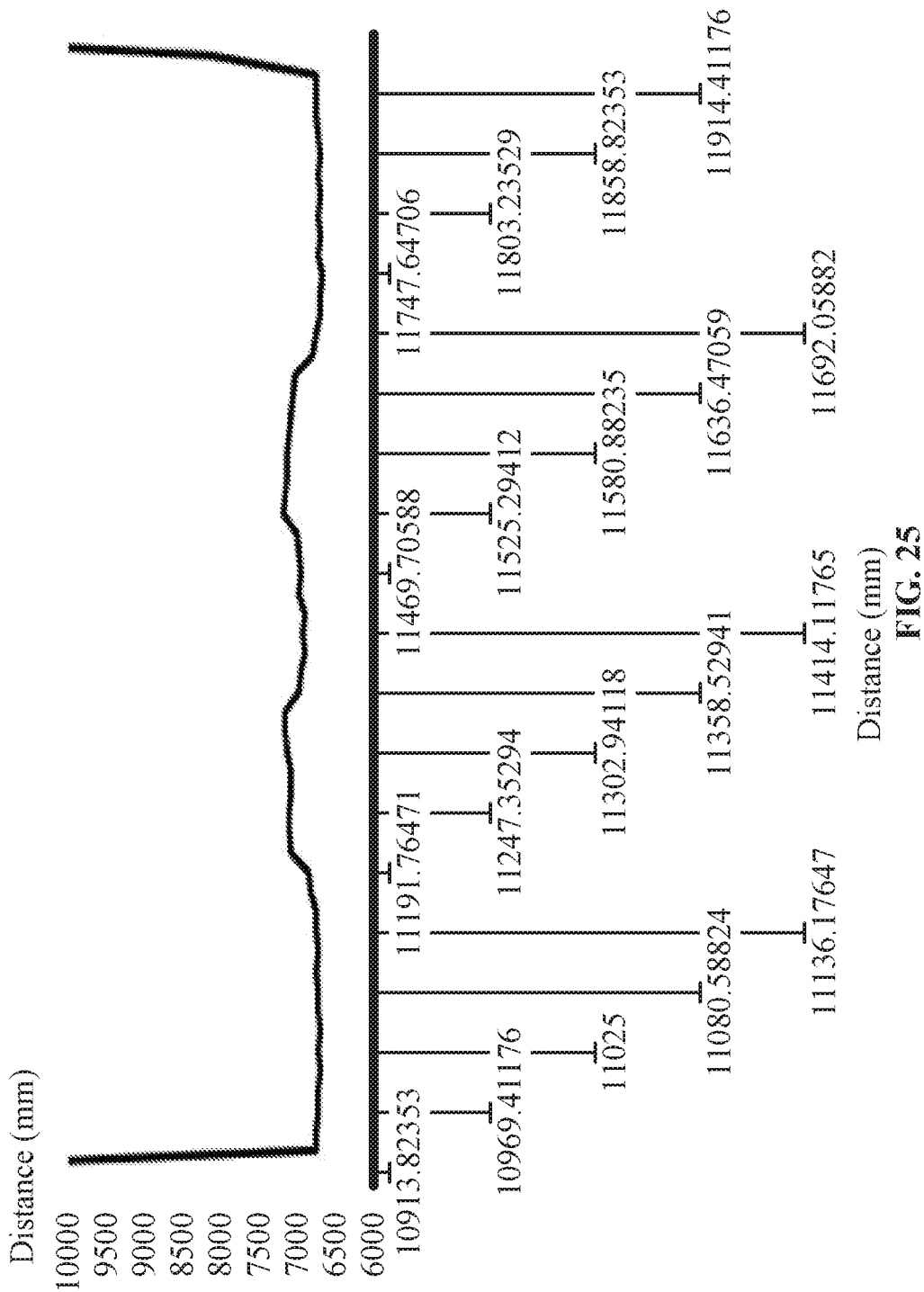
Figure 26:
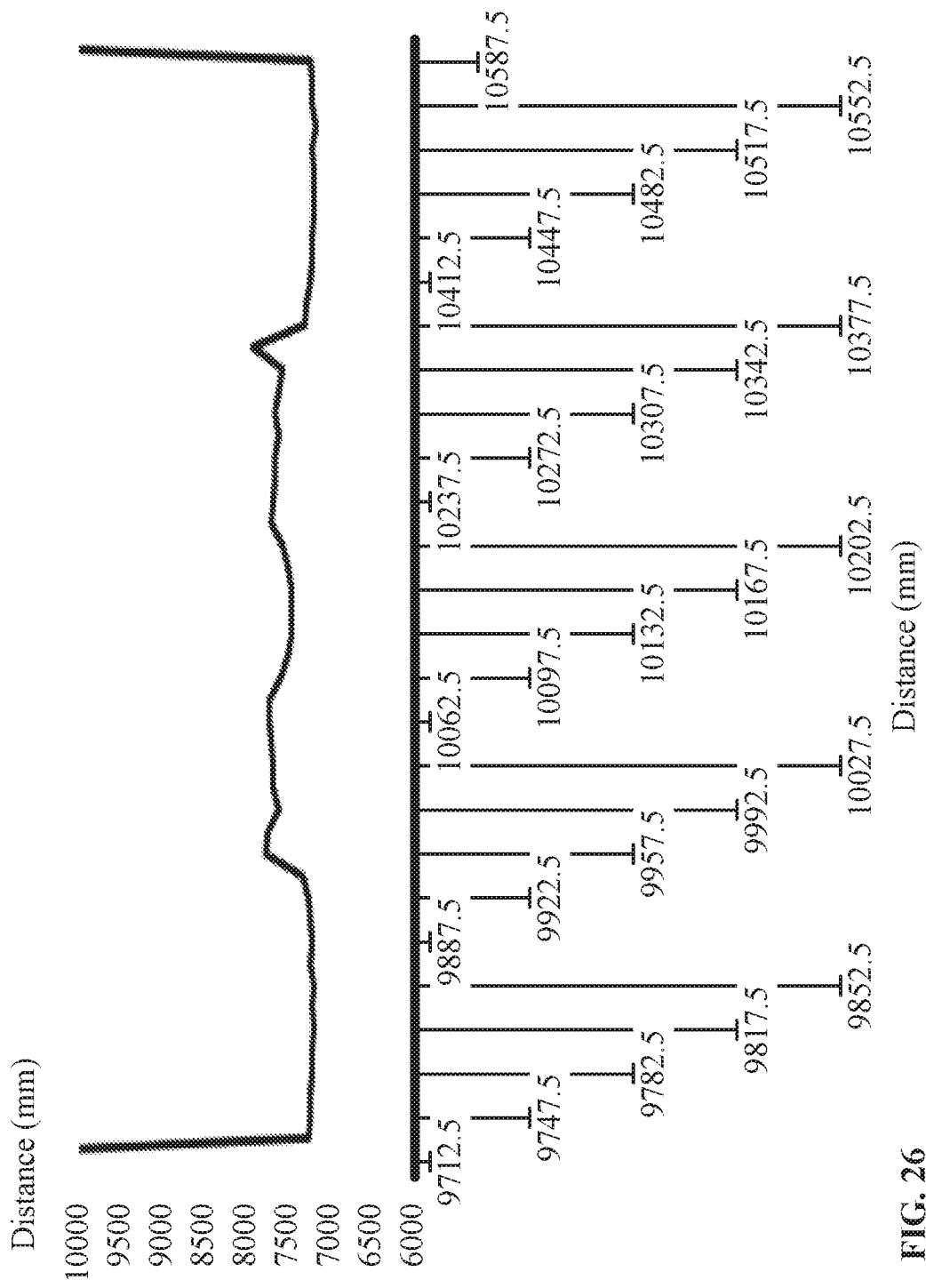
Figure 27:
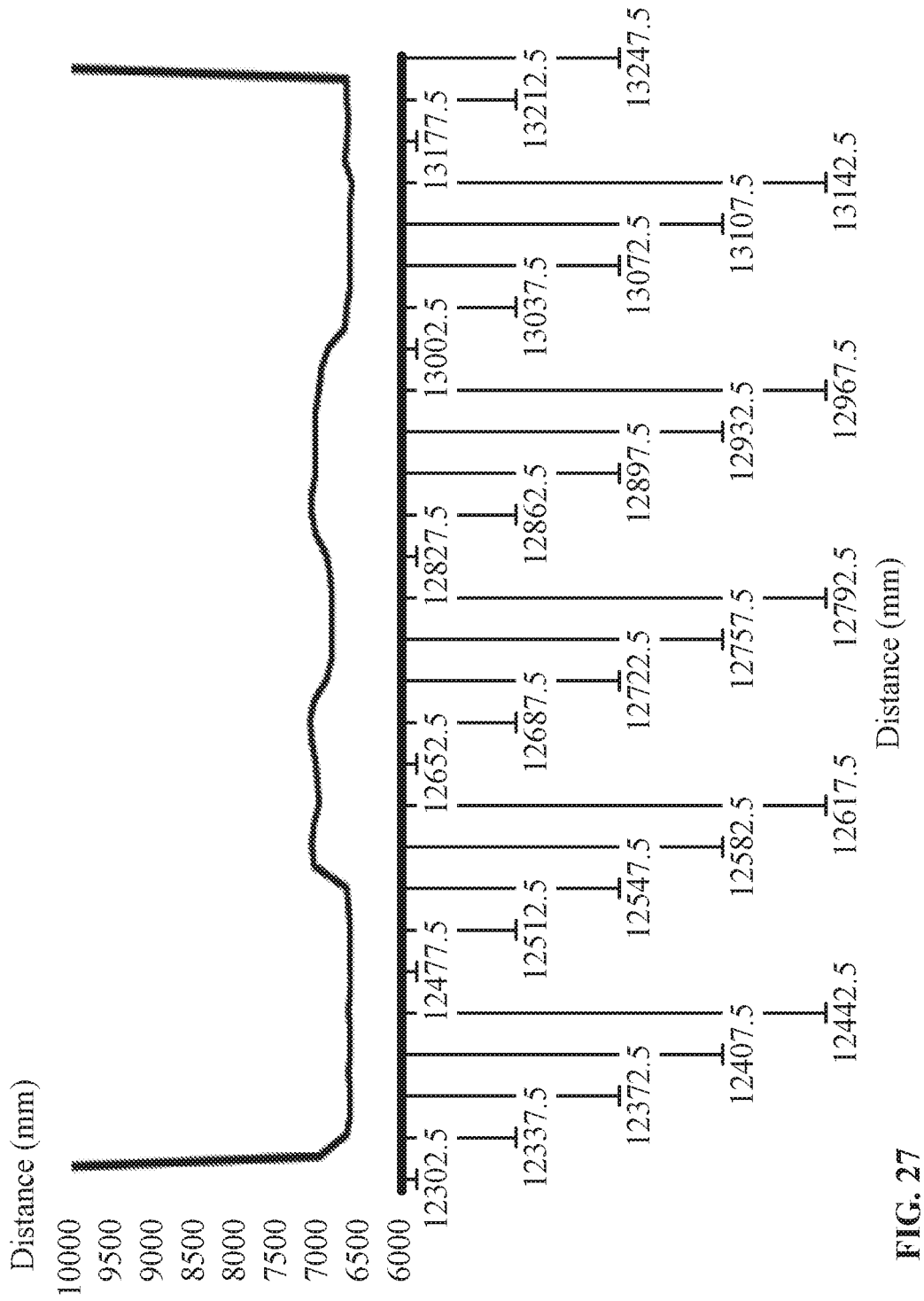
Figure 28:
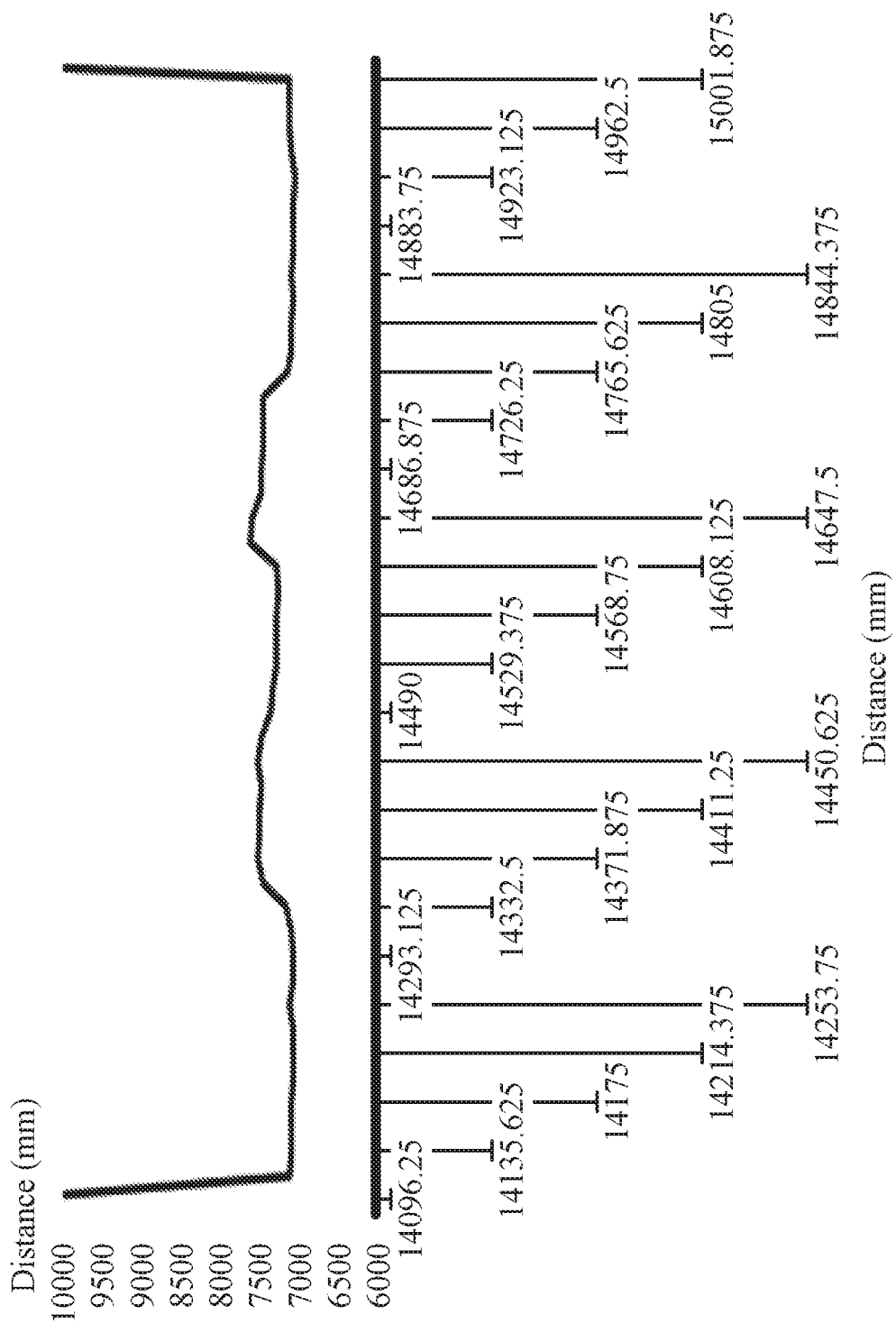

| | The disclosure | | | | Wide-angle camera | | |
| --- | --- | --- | --- | --- | --- | --- | --- |
| | | | | Wheel path | | | Wheel path |
| | | Wheel | | transverse | Wheel | | transverse |
| Vehicle | Measured | classifi- | Diameter | distribution | classifi- | Diameter | distribution |
| No. | drawings | cation | (inch) | (Voltage signal value) | cation | (inch) | (mm) |
| 1 | FIG. 19 | Tubeless | 22.5 | 2327 | Tubeless | 22.5 | 1020 |
| 2 | FIG. 20 | Tube | 22.5 | 2302 | Tube | 22.5 | 930 |
| 3 | FIG. 21 | Tube | 20 | 2330 | Tube | 20 | 1020 |
| 4 | FIG. 22 | Tube | 20 | 2175 | Tube | 20 | 600 |
| 5 | FIG. 23 | Tubeless | 22.5 | 2146 | Tubeless | 22.5 | 550 |
| 6 | FIG. 24 | Tubeless | 22.5 | 2111 | Tubeless | 22.5 | 460 |
| 7 | FIG. 25 | Tube | 22.5 | 2260 | Tube | 22.5 | 760 |
| 8 | FIG. 26 | Tubeless | 22.5 | 2305 | Tubeless | 22.5 | 880 |
| 9 | FIG. 27 | Tubeless | 22.5 | 2282 | Tubeless | 22.5 | 850 |
| 10 | FIG. 28 | Tubeless | 22.5 | 2051 | Tubeless | 22.5 | 320 |

The actual measure map was a schematic diagram of the real size on one side of the horizontal section of the wheel of each group of vehicle associates with the distance between one side of the horizontal section of the wheel and the road shoulder, and the data was the fitting data of the wheel.

As shown in Table 2, the wheel type and wheel size data obtained by the disclosure are consistent with the wheel type and wheel size data obtained by a high-resolution camera with a wide angle. The value of the digital signal is X, and the transverse distribution characteristic value of the vehicle's wheel path is calculated by the formula $Y=2.3811X-4579.7$, and the variance of the wheel path transverse distribution data obtained by the high-resolution camera with a wide-angle is $R^2=0.97$. When considering the video playback to record the wheel path transverse distribution data, errors may occur due to human factors and the setting of the road surface scale. On the contrary, in the disclosure the feasibility and accuracy of obtaining the vehicle wheel path transverse distribution are excellent.

It will be obvious to those skilled in the art that changes and modifications may be made, and therefore, the aim in the appended claims is to sleeve piece all such changes and modifications.

What is claimed is:
1. A method, comprising:
  1) measuring, by a measurement device, a shape and size of one side of a horizontal section of each of a plurality of vehicles, and a distance between the one side of the horizontal section of each of the plurality of vehicles and a road shoulder where the plurality of vehicles is moving, wherein the measurement device comprises two ultra-high frequency (UHF) laser distance sensors disposed side by side and parallel to the one side of the horizontal section of each of the plurality of vehicles on the same height; the horizontal section of the vehicle is parallel to the road shoulder and has the same height as the two laser distance sensors;
  2) acquiring, by the measurement device, analog signal voltage data of each of the plurality of vehicles, and identifying each of the plurality of vehicles according to the analog signal voltage data;
  3) calculating a running speed of each of the plurality of vehicles; calculating a time interval of acquiring a vehicle signal by the two laser distance sensors; converting the analog signal voltage data into length data, to yield real shape and size data of the one side of the horizontal section of each of the plurality of vehicles; calculating an axle number and length of each of the plurality of vehicles, identifying a vehicle classification; storing the data of the vehicle classification and the data of the shape and size of one side of the horizontal section of each of the plurality of vehicles in a first database, to yield a target vehicle database;
  4) creating a raw database of wheels in the first database, the raw database of wheels comprising a real shape and size of one side of a horizontal section of the wheels having characteristics of "concave-concave-concave-concave-concave" on the one side;
  5) extracting the target vehicle database and the raw database of wheels from the first database, comparing, by the analysis device, similarity of the target vehicle database and the raw database of wheels, acquiring target wheels from the target vehicle database, storing the target wheels in a target wheel database, the target wheel database comprising the real shape and size of the one side of the horizontal section of the wheels and a distance between the one side of the horizontal section of the wheels and the two laser distance sensors; and
  6) drawing, based on the target wheel database, a characteristic curve of transverse distribution of wheel path of each of the plurality of vehicles, calculating a coefficient of transverse distribution of the wheel path of each of the plurality of vehicles, acquiring sizes of a tire, rim, spoke and hub of wheels of each of the plurality of vehicles, and storing relevant data in a second database.

2. The method of claim 1, wherein in 2), identifying each of the plurality of vehicles comprises: the analog signal voltage data comprising a plurality of consecutive signal points and blank areas between the plurality of consecutive signal points, when a number of the blank areas is larger than a certain value, dividing the analog signal voltage data into a plurality of segments; classifying the plurality of segments into different groups according to a range of the blank areas; and calculating a distance between data points and the laser distance sensors, and determining whether or not each group of data belongs to one vehicle.

3. The method of claim 1, wherein for one vehicle, a Pearson correlation coefficient of two groups of data of the one vehicle respectively obtained by the two laser distance sensors is calculated; when the Pearson correlation coefficient is larger than 0.85, the running speed of the vehicle is calculated as follows: simultaneously scanning one side of the horizontal section of one wheel by the two laser distance sensors, calculating the running speed V by a horizontal distance S between the two laser distance sensors and a time interval Δt between two first data received by the two laser distance sensors; converting the data from a distance-time (D-T) correlation into a distance-length (D-L) correlation, to yield real shape and size characteristic data of one side of the horizontal section of the vehicle; and outputting the real shape and size characteristic data to the first database.

4. The method of claim 1, wherein the target vehicle database is two-dimensional with length as an abscissa and distance as an ordinate; the time interval of acquiring a signal of a vehicle by the two laser distance sensors multiplies the running speed of the vehicle, to yield the real shape and size data of one side of the horizontal section of the vehicle; the real shape and size data is fitted and associated with the distance between one side of the horizontal section of the vehicle and the two laser distance sensors to yield the target vehicle data.

5. The method of claim 1, wherein the raw database of wheels is two-dimensional with length as an abscissa and distance as an ordinate; the raw database of wheels is obtained in a laboratory following the method of establishing the target vehicle database where the wheels are measured.

6. The method of claim 1, wherein in 5), the target wheels are acquired as follows: calculating a Pearson correlation coefficient between a piece of data from the target vehicle database and a piece of data from the raw database of wheels; when the Pearson correlation coefficient is larger than 0.95, the piece of data from the target vehicle database is intercepted and stored in the target wheel database; the target wheel database is two-dimensional with length as an abscissa and distance as an ordinate.

* * * * *